United States Patent [19]
Ward et al.

[11] Patent Number: 5,091,971
[45] Date of Patent: Feb. 25, 1992

[54] METHOD AND APPARATUS FOR HIGH-SPEED ELECTRONIC DATA SIGNAL MODIFICATION AND IMPROVEMENT

[75] Inventors: Joseph W. Ward, Pittsford, N.Y.; Kenneth Wang, La Palma, Calif.; Joel Lissade, Henrietta, N.Y.; Paula Siviy, Webster, N.Y.; David G. Wilcox, Macedon, N.Y.; Agatha Yang, Hawthorne, Calif.

[73] Assignee: Xerox Corporation, Stamford, Conn.

[21] Appl. No.: 590,126

[22] Filed: Feb. 28, 1990

[51] Int. Cl.$^5$ ............................................. G06K 9/40
[52] U.S. Cl. .................................... 382/54; 382/27; 358/461
[58] Field of Search ............................ 382/51, 54, 27; 358/461, 463, 464, 455, 456

[56] References Cited

U.S. PATENT DOCUMENTS

| | | | |
|---|---|---|---|
| 4,143,401 | 3/1979 | Coviello | 358/96 |
| 4,365,304 | 12/1982 | Ruhman et al. | 364/515 |
| 4,695,884 | 9/1987 | Anastassiou et al. | 358/163 |
| 4,703,513 | 10/1987 | Gennery | 382/27 |
| 4,736,438 | 4/1988 | Persoon et al. | 382/34 |
| 4,783,838 | 11/1988 | Matsunawa | 382/51 |

Primary Examiner—Leo H. Boudreau
Assistant Examiner—Steven Klocinski
Attorney, Agent, or Firm—Oliff & Berridge

[57] ABSTRACT

A method and apparatus for modifying an image data signal has a serial channel for obtaining a desired number of current M-bit patterns from the image data. Unique bit patterns are recognized in the current bit patterns, and new bit patterns are generated, each being specific to the detected unique bit pattern. The current and new bit patterns are combined in a predetermined manner to modify the image data as desired. For example, if the unique bit patterns are recognized as dark images on a leading edge of an image, the new bit patterns are generated and combined with the current bit patterns to lighten the image, particularly at the leading edge to improve stripping of the print media on which the image is printed from a fuser roll of the printer.

39 Claims, 21 Drawing Sheets

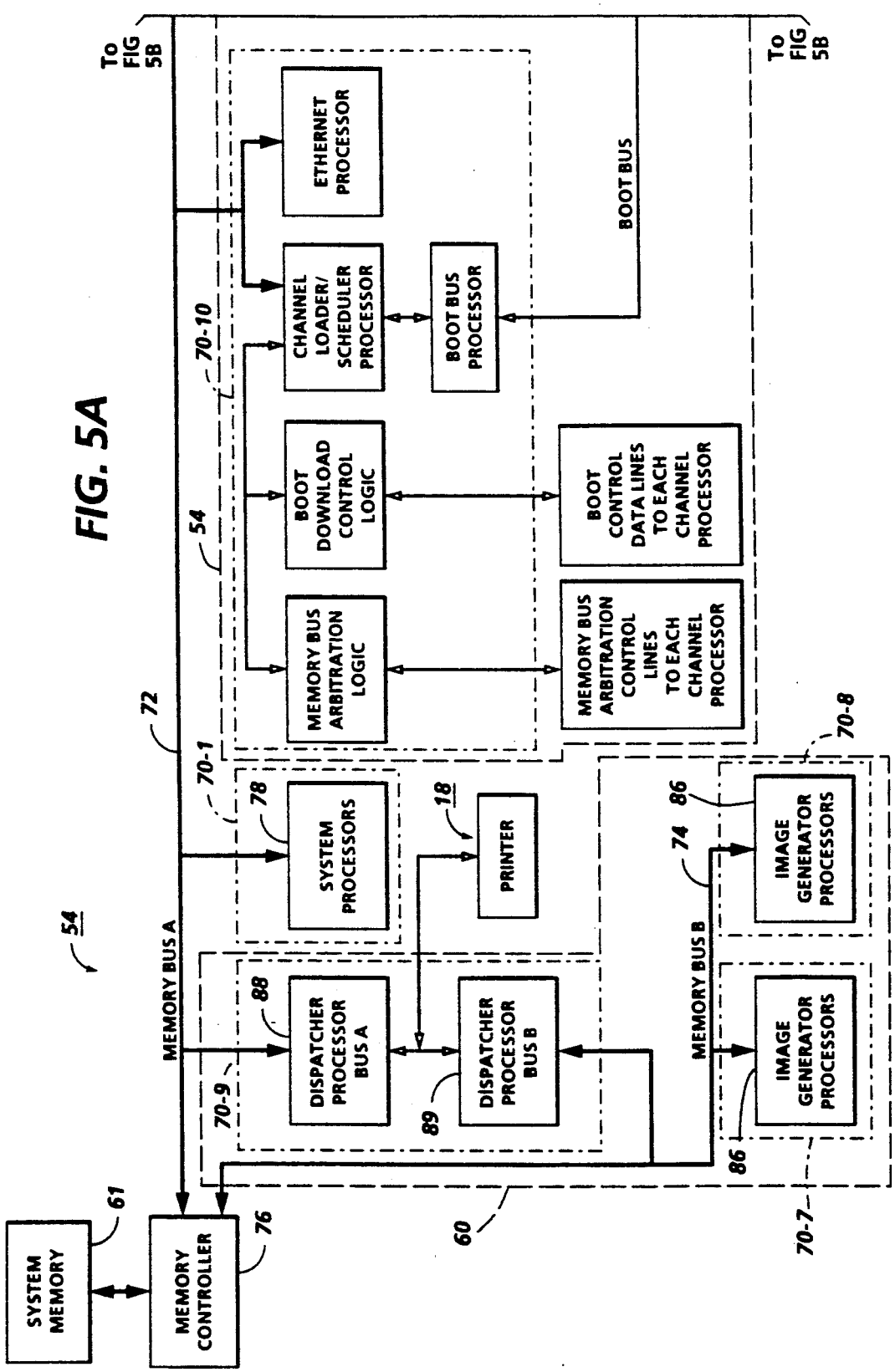

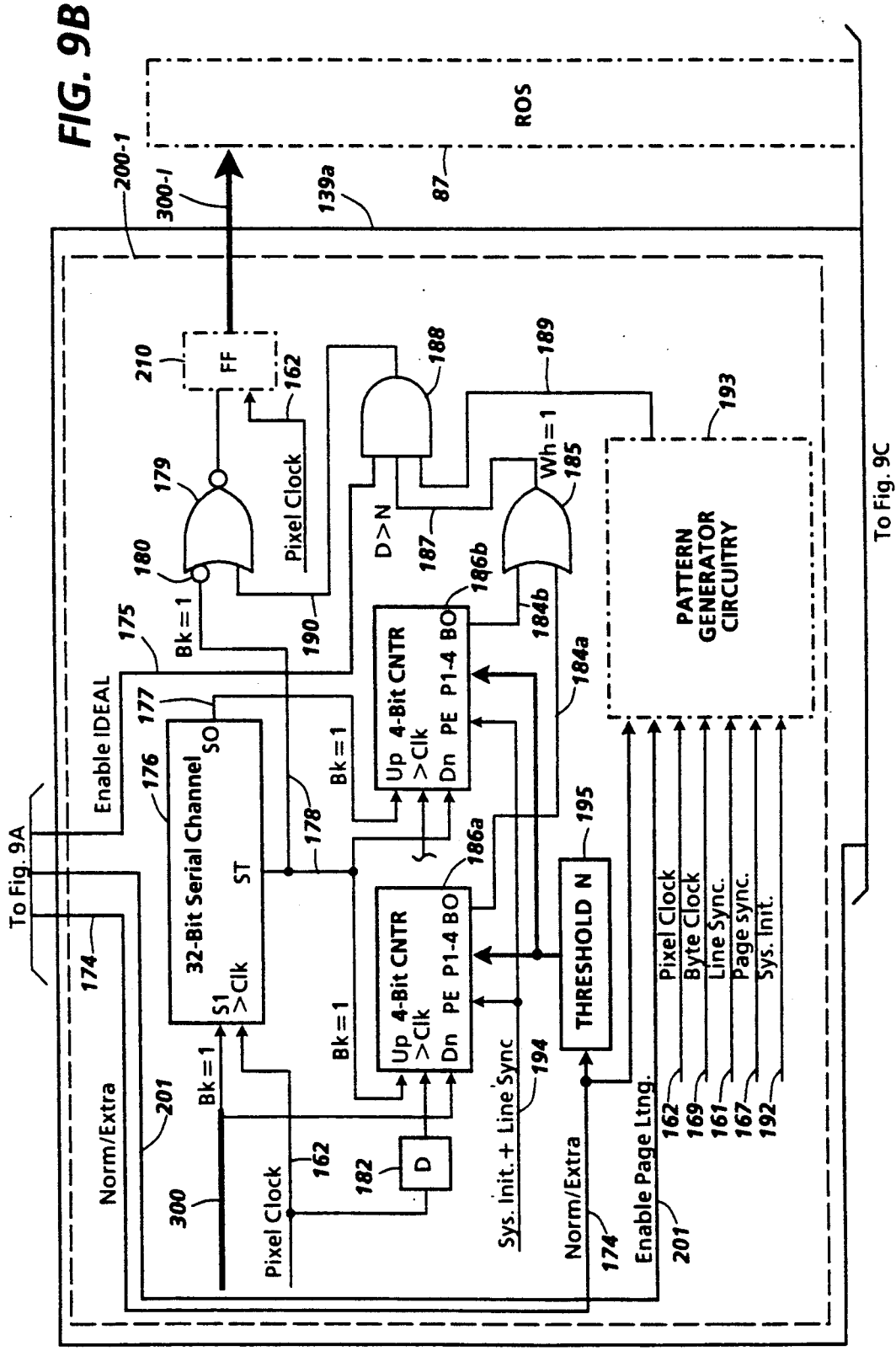

DECODE "A" TRUTH TABLE

| A B C | COND. | $S_0$ $S_1$ $C_i$ |
|---|---|---|
| 0 0 1 | HOLD | 1 1 0 |
| 0 1 1 | INCREMENT | 0 1 0 |
| 1 0 1 | DECREMENT | 1 0 0 |
| 1 1 1 | HOLD | 1 1 0 |
| X X 0 | PRESET N | 0 0 0 |

*FIG. 10B*

DECODE "B" TRUTH TABLE

| $S_0$ $S_1$ $C_i$ | COND. | QN |
|---|---|---|
| 0 0 0 | PRSTCT | 0 |
| 0 0 1 | XXX | |
| 0 1 0 | CARRY / R | 0 |
| 0 1 1 | INC / HLD | $Q_{-1}$ |
| 1 0 0 | BRRW/S | 1 |
| 1 0 1 | DEC / HLD | $Q_{-1}$ |
| 1 1 0 | XXX | |
| 1 1 1 | HLD / HLD | $Q_{-1}$ |

*FIG. 10C*

DECODE TRUTH TABLE

A = BEAM 1 IN
B = BEAM 1 EX

| A B C | COND. | $S_0$ $S_1$ |
|-------|-------|-------------|
| 0 0 1 | HOLD  | 1 1 |
| 0 1 1 | DEC.  | 1 0 |
| 1 0 1 | INC.  | 0 1 |
| 1 1 1 | HOLD  | 1 1 |
| X X 0 | RESET | 0 0 |

*FIG. 11B*

METHOD AND APPARATUS FOR HIGH-SPEED ELECTRONIC DATA SIGNAL MODIFICATION AND IMPROVEMENT

BACKGROUND OF THE INVENTION

1. Field of the Invention

The present invention pertains to high-speed electronic data signal processing for continuously monitoring one or more data streams and automatically detecting and selectively modifying particular data patterns to produce correction, enhancement, improvement, etc. in real time. More particularly, the present invention pertains to a method and apparatus for automatically adjusting image density selectively in detected image areas within a desired region of an image frame or page so as to vary or blend the adjusted density within the detected areas which approach or are located near regional boundaries. One or more data streams can be modified, for example, to selectively lighten very dense image areas along the leading edge of each imaged page in order to enhance the reliability of paper handling through a xerographic processor. The present invention improves paper stripping reliability when paper exits the fuser roll, while minimally degrading visual image quality.

2. Description of Related Art

The intelligent, selective and precise digital processing and modification of complex digital information signals (such as video image data, or other intelligible digital data streams) at very high speeds has typically required complex functional modules with extensive computational and/or interpretive capability.

A number of efforts have been made to improve or enhance processed images. U.S. Pat. No. 4,736,438 to Persoon et al discloses an image processing device for real time processing wherein a two-dimensional array of pixels is compared to a known image. The image processor can receive up to three data inputs each of which is four bits wide. U.S. Pat. No. 4,143,401 to Coviello discloses a system for generating line drawings of a scanned image wherein changes in a gray scale of an image are detected and used to create a line drawing on the image. U.S. Pat. No. 4,365,304 to Ruhman et al discloses a method and apparatus for on-line data enhancement wherein a histogram modification method is used to enhance an image.

However, a need exists for a simple and cost effective electronic functional module which can be adapted to one or more serial data bit streams from any source, representing, for example, "video", serialized image data, or other encoded visual or other signal information, to faithfully monitor the data for unique codes or patterns, and automatically modify, replace, decode or otherwise respond to any number, or arrangements, of input codes as required or desired for a particular application.

SUMMARY OF THE INVENTION

Accordingly, it is an object of the present invention to provide a method and apparatus for automatically detecting and selectively modifying particular data patterns in real time.

It is another object of the present invention to provide a low cost method and apparatus for high speed electronic data signal processing (particularly applicable to serial data streams) which continually monitors one or more data streams and automatically detects and selectively modifies particular data patterns dynamically (in real time) to produce correction, enhancement, or other desired results.

It is a further object of the present invention to provide a method and apparatus for identifying and selectively correcting very dense image areas along the leading edge of each imaged page in an electronic reprographic system so as to enhance the reliability of paper handling through the xerographic processor, particularly to improve paper stripping reliability when paper exits the fuser roll, while minimally degrading visual image quality.

It is yet another object of the present invention to adjust and rearrange inputted image data so that the outputted image or copy is superior to the original.

It is a further object of the present invention to apply a lead edge lightening process to the lead edge of a page and not to disturb the image otherwise.

These and other objects and advantages of the present invention are obtained by providing a method and apparatus for continuously monitoring a data channel to automatically detect and selectively modify particular data patterns in real time so as to correct and improve the printer output. The process comprises the steps of:

a) tapping into image data of said image data channel;

b) obtaining N-bit patterns from said image data;

c) detecting a multiplicity of unique patterns, with pattern recognition logic based on said N-bit patterns;

d) obtaining a recognition signal from said logic for each bit pattern recognized;

e) generating new M-bit data patterns specific to each recognition signal; and f) combining said M-bit data patterns with image data in the data channel to provide a modified bit pattern output.

This process is described by its inventors as "Interpretive Decoded-Element Automatic Logic", or "IDEAL" processing, and hereinafter shall be referred to by the acronym IDEAL for convenience. An adaptation of IDEAL processing is incorporated into a xerographic reproduction processor, and particularly implemented to automatically modify image density selectively in detected image (density) areas within specified regions of the image page (e.g., usually applied within a defined region near the "leading edge of each imaged page), and furthermore to vary and blend the adjusted density approaching and near regional boundaries. This specific application accommodates the need to enhance the reliability of imaged paper handling in the xerographic processor, and particularly to improve paper stripping reliability upon exiting the fuser roll, while minimally degrading the visual image quality. In this context, IDEAL processing thus also provides "Intelligent Dark-Edge Automatic Lightening" to optimize the printing process for high speed and image quality.

An IDEAL processing circuit is incorporated within the xerographic printer in the video data lines which modulate the Raster Output Scanner (ROS) to perform a running average density determination of a data signal at each successive pixel clock. At every sample time (i.e., each pixel clock) the detection circuits evaluate a group of data bits (e.g. 16 successive adjacent data bits) and determine how many of that group are black. If the number of black bits in the group exceeds a preset but programmable threshold, (typically around 12 out of 16 or about 75% of a 16-bit sample), the output data pattern is modified (that is lightened) by applying the output from a dynamically variable pattern generator circuit synchronized to the page dimensions and initialized at the lead edge by the page sync signal. The dynamic pattern generator may selectively apply a different 8-bit pattern, or 8×n-bit pattern upon successive groups of 8, or 3×n data bits, in either or both page image dimensions: that is, fast-scanned and/or slow scanned directions. Also the pattern generator may be enabled and active either over the full page, or else only in defined areas or regions (e.g., along a "leading-edge" border, with defined dimensions, etc.).

BRIEF DESCRIPTION OF THE DRAWINGS

The invention will be described in detail with reference to the following drawings, wherein:

FIGS. 5A, 5B and 5C comprise a schematic block diagram showing the major parts of the job administration control section and document image processing system for the printing system shown in FIG. 1;

FIGS. 10B, 10C and 11B are data tables, FIGS. 10B and 10C being employed with the FIG. 10A circuit, and FIG. 11B being employed with the FIG. 11A circuit.

DETAILED DESCRIPTION OF THE INVENTION

Figure 1:
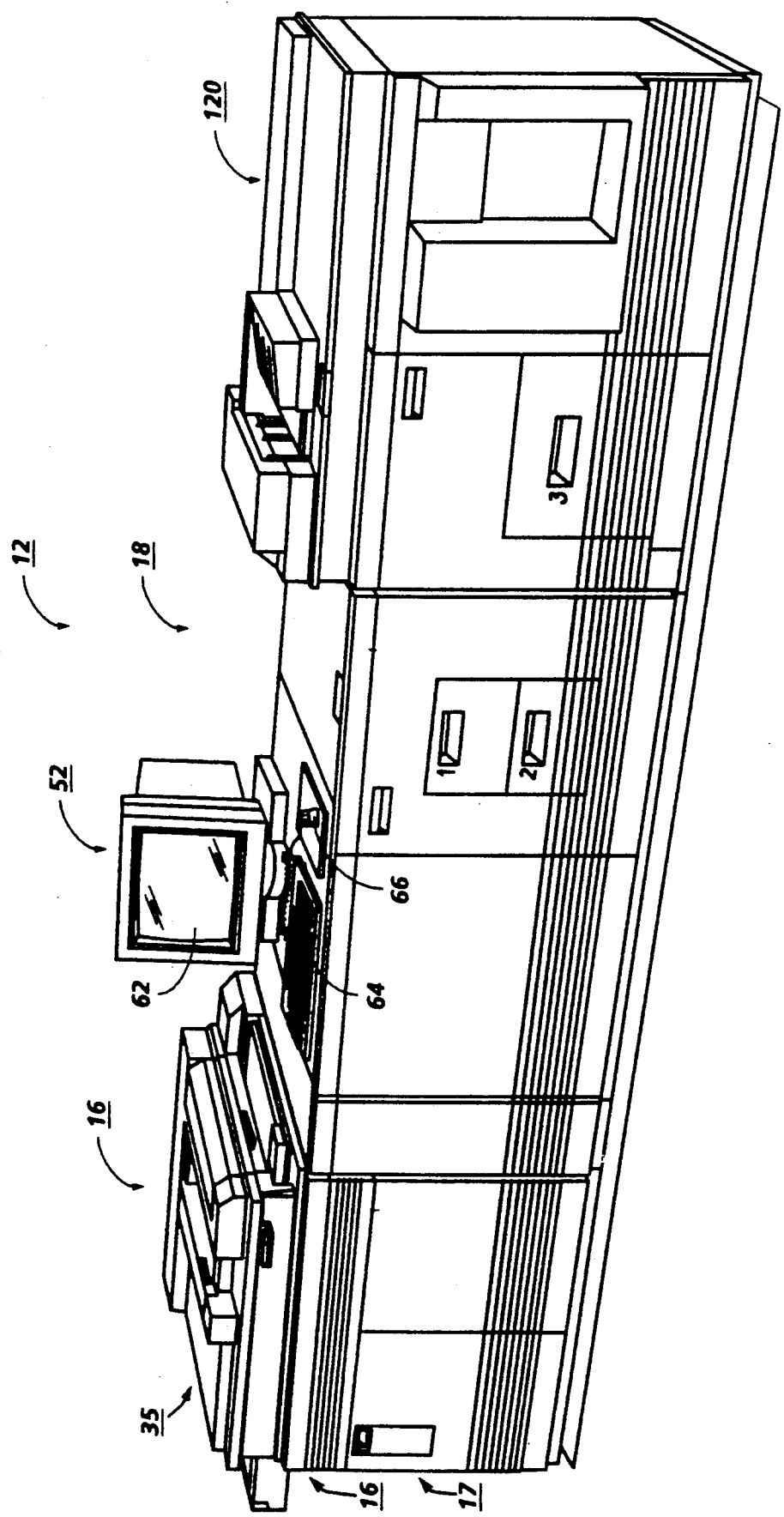
FIG. 1 is a perspective view of an electronic printing system of the present invention.
Figure 2:
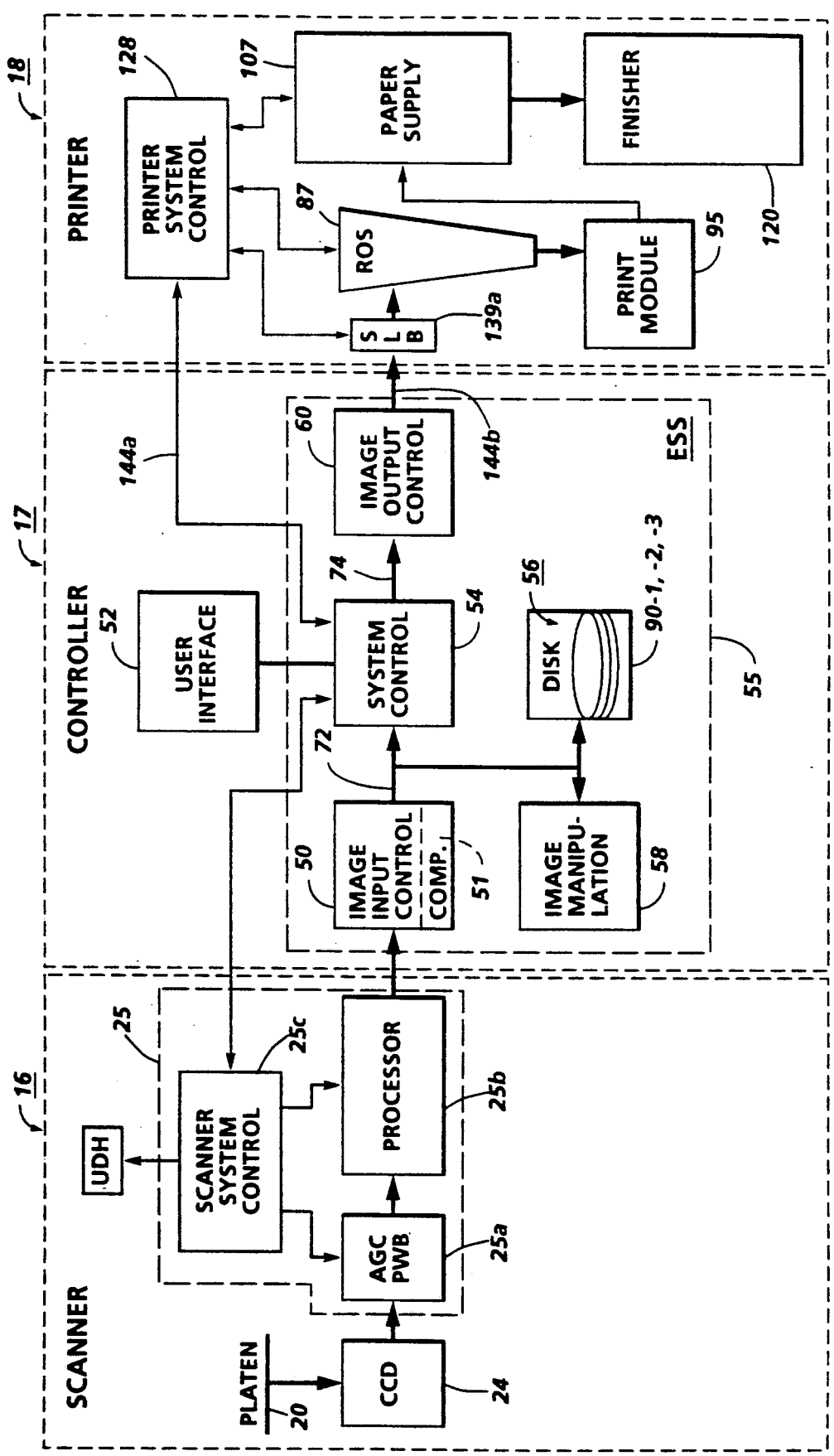
FIG. 2 is a block diagram depicting the major elements of the printing system shown in FIG. 1.

Referring now to the drawings, wherein like reference numerals designate identical or corresponding parts throughout the several views, and more particularly to FIGS. 1 and 2, there is shown an exemplary laser based xerographic printing system 12 for processing print jobs in accordance with the teachings of the present invention. Printing system 12 for purposes of explanation is divided into a scanner section 16, controller section 17, and printer section 18. While a specific printing system is shown and described, the present invention may be used with other types of printing systems such as ink jet, ionographic, thermal, photographic, etc., and further more may be incorporated in electronic display systems, such as CRTs, LCDs, LEDs, etc., or else other image scanning/processing/recording system, or else other signal transmitting/receiving/recording systems, etc. as well.

Figure 3A:
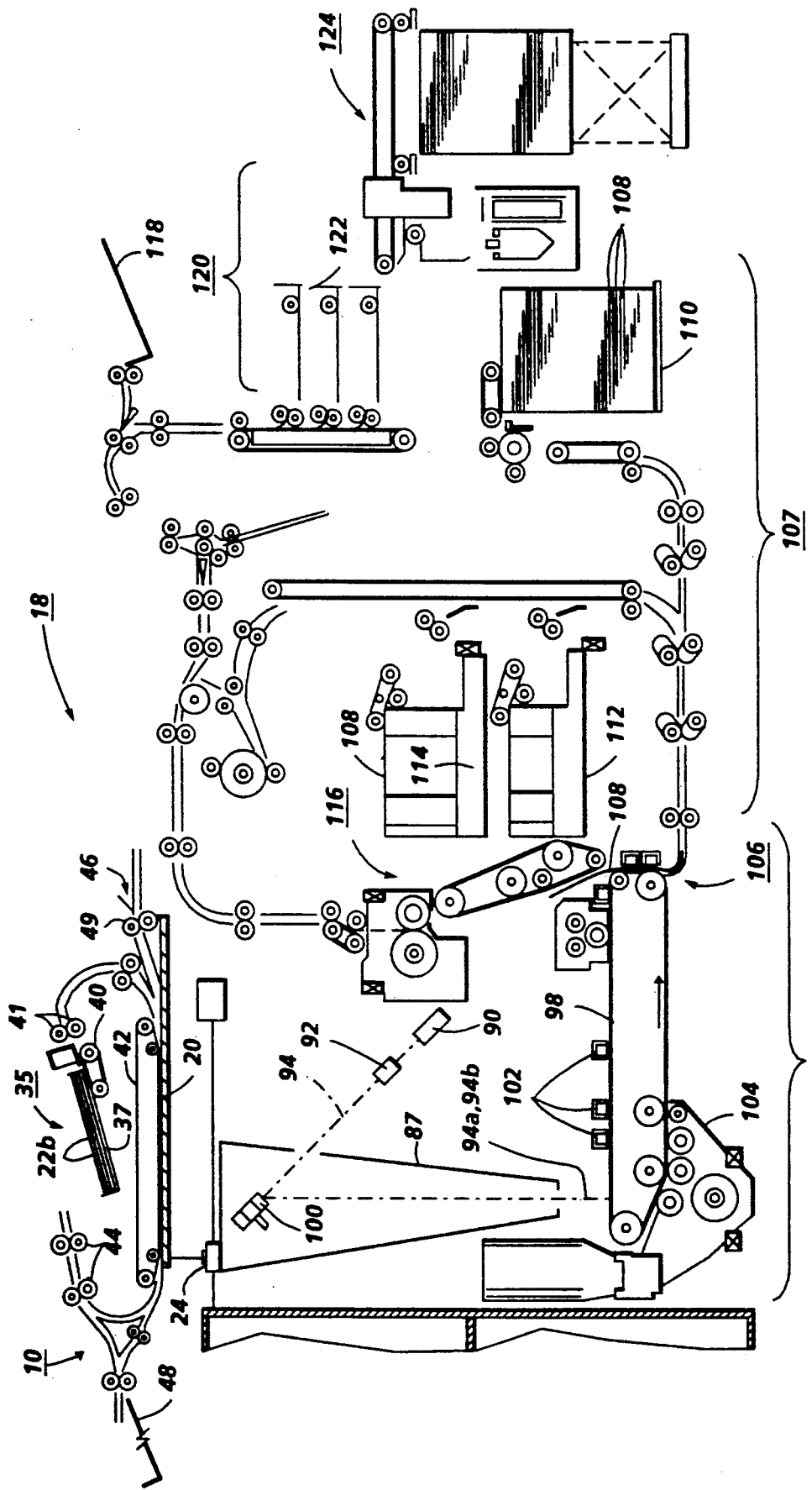
FIG. 3A is a frontal view illustrating the principal mechanical components of the printing system shown in FIG. 1.
Figure 3B:
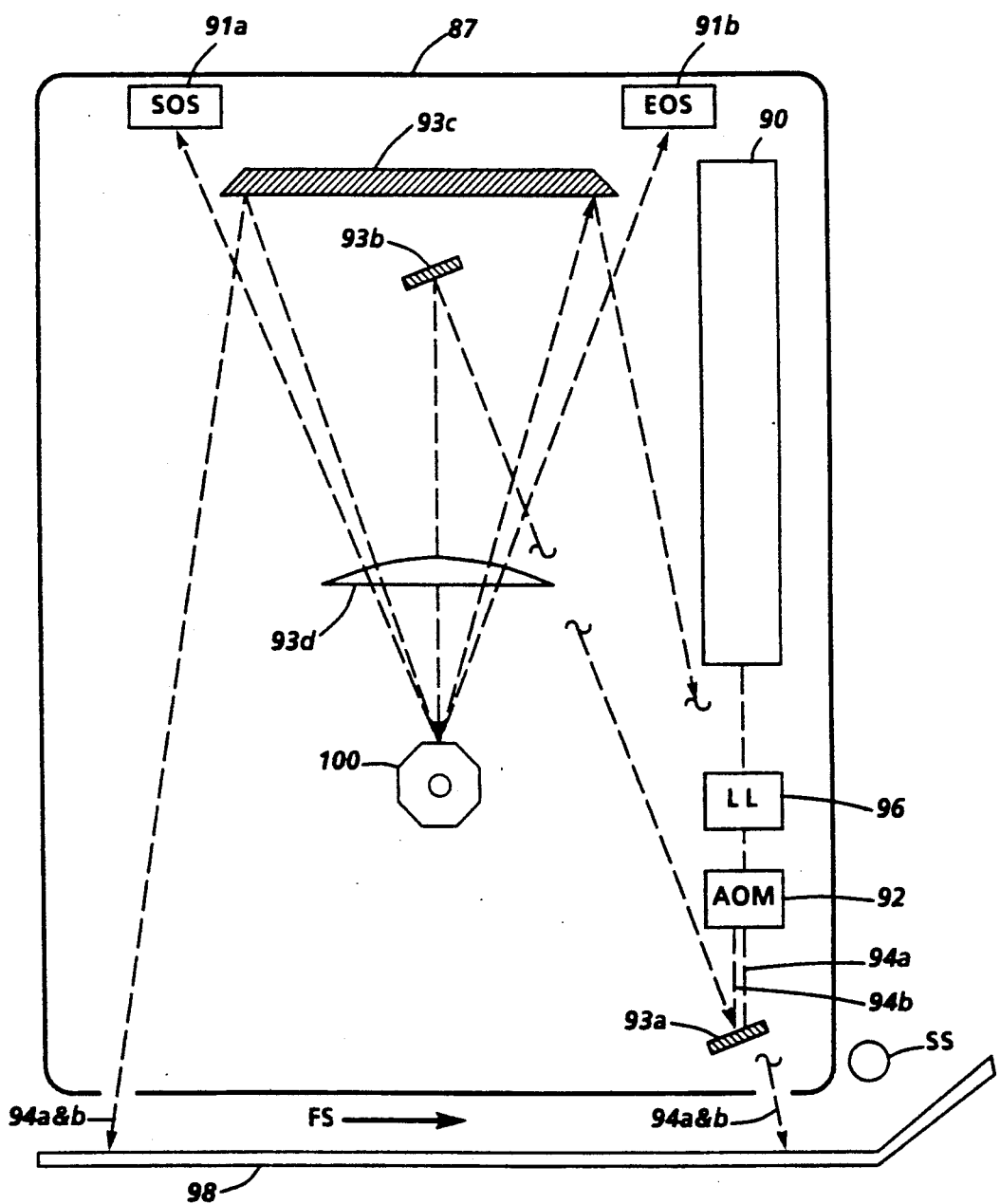
FIG. 3B is a (left) side view of the Raster Output Scanner (ROS) image writing device within the printing system of FIG. 3A, showing additional detail.
Figure 3C:
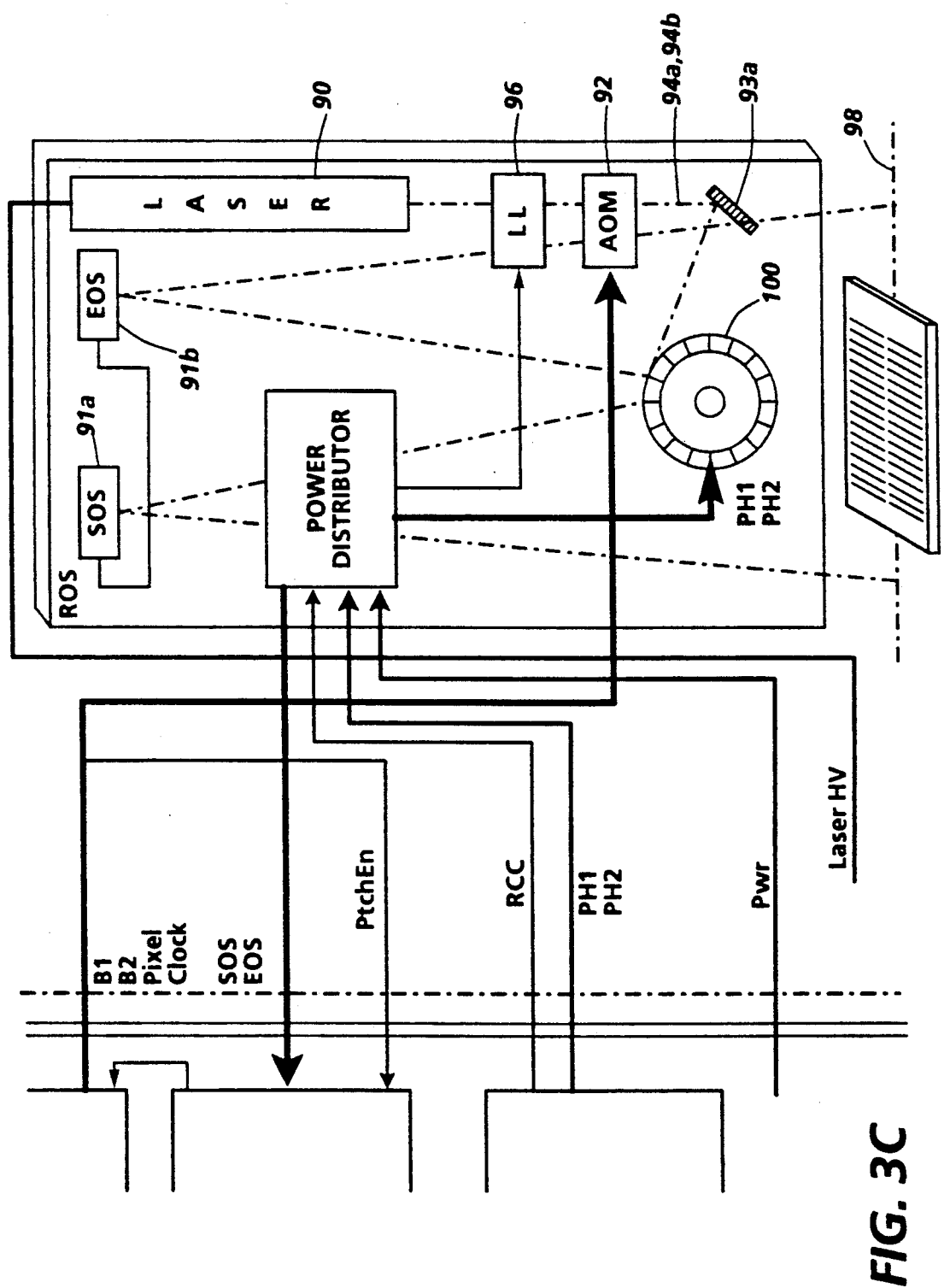
FIG. 3C is an alternative embodiment of the ROS image writing device.
Figure 4:
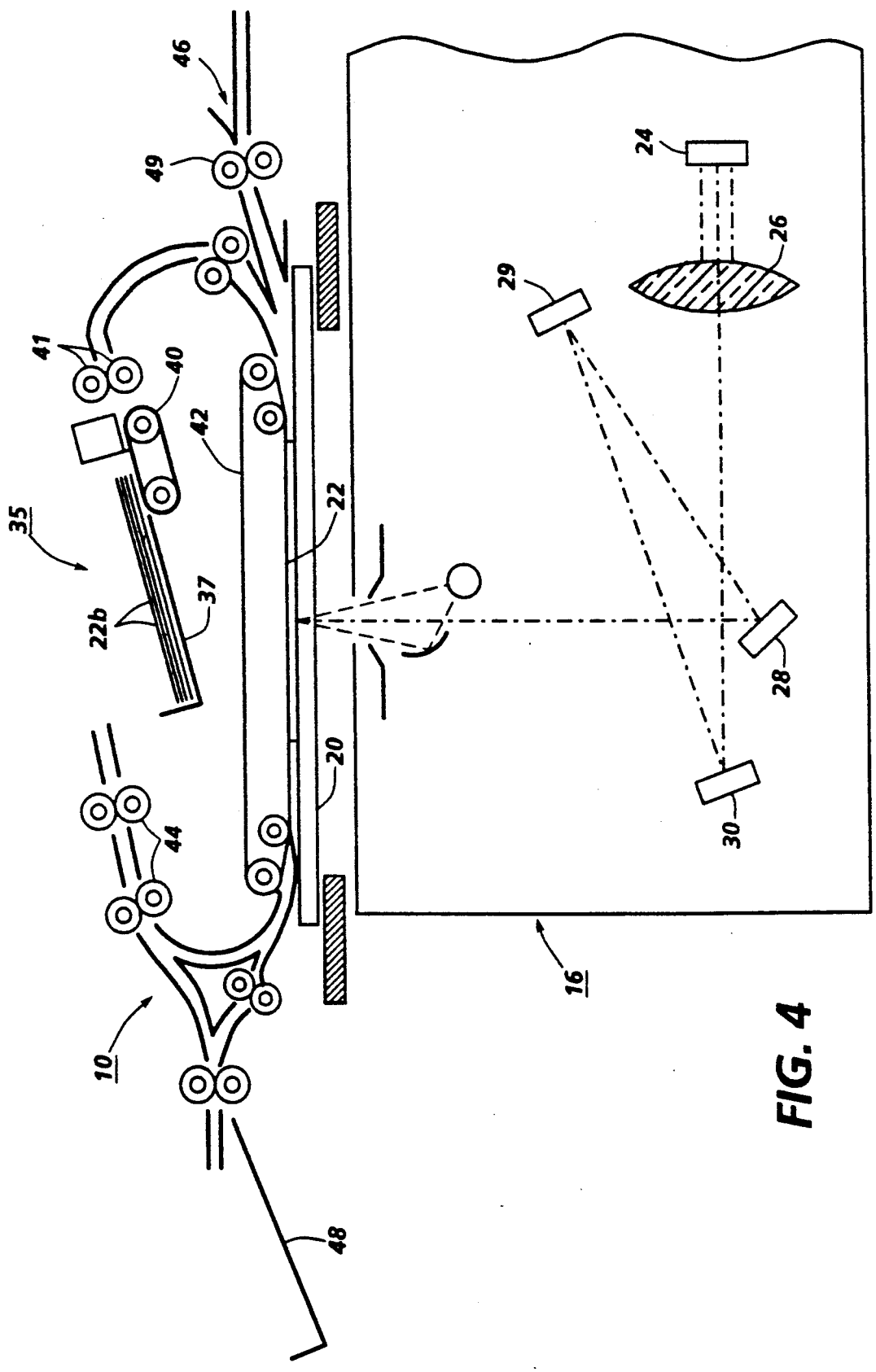
FIG. 4 is a schematic view showing certain construction details of the document scanner for the printing system shown in FIG. 1.

Referring particularly to FIGS. 2 through 4, scanner section 16 incorporates a transparent platen 20 on which the document 22 to be scanned is located. Scanner system 16 incorporates a universal Document Handler (UDH), 35, for the purpose of automatically and sequentially placing and locating sets of multiple documents for scanning. Within the scanner, one or more linear light sensitive arrays 24 are supported for reciprocating scanning movement below platen 20. Lens 26 and mirrors 28, 29, 30 cooperate to focus array 24 on a line like segment of platen 20 and the document 22 thereon being scanned. Array 24, which may utilize Charge-Coupled Device (CCD) technology, or the like, provides image elemental signals, or pixels, representative of the image scanned which, after suitable processing by processor 25, are output to controller section 17. The processor 25 communicates with the system controller 54 (described below) and includes a scanner system control 25c, an automatic gain control printed wiring board (AGCPWB) 25a and a processor 25b.

AGCPWB 25a converts the analog image signals output by array 24 to digitally represented facsimile signals and processor 25b processes the digital image signals as required to enable controller system 17 to store and handle the image data in the form and order required to carry out the job programmed. Processor 25 also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification within scan processor 25.

Multiple documents 22b to be scanned may be located on platen 20 for scanning by Universal Document Handler (UDH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which multiple documents 22b are arranged in stacks or batches. The documents 22b in tray 37 are advanced by vacuum feed belt 40 and document feed rolls 41 and document feed belt 42 onto platen 20 where the document is positioned and scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, fanfold computer form material is fed through slot 46 and advanced by feed rolls 49 to document feed belt 42 which in turn advances a page of the fanfold material into position on platen 20.

Referring to FIGS. 2 and 3A and 3B, printer section 18 comprises a laser type printer and for purposes of explanation is separated into a Raster Output Scanner (ROS) section 87, Print Module Section 95, Paper Supply section 107, and Finisher 120. Referring particularly to FIG. 3B, ROS 87 has a laser 90, the beam of which is passed through an acousto-optic modulator 92 (AOM) where upon it is split into two imaging beams 94a and 94b. Furthermore, each beam 94a, 94b is modulated in accordance with the content of an image signal input by acousto-optic modulator 92 to provide dual imaging beams 94a and 94b. Beams 94a, 94b are scanned across a moving photoreceptor 98 of Print Module 95 by the mirrored facets of a rotating polygon 100 (and also assisted by plural optical mirrors and lenses 93a-93b, and further synchronously timed with output signals from Start-Of-Scan (SOS) sensor 91a, and End-Of-Scan (EOS) sensor 91b), to expose two image lines on photoreceptor 98 with each scan and create the latent electrostatic images represented by the image signal input to modulator 92. FIG. 3C illustrates an alternative embodiment for ROS 87.

In FIG. 3B, arrow FS indicates the fast scan direction corresponding to the scan direction of ROS Beams 94a and 94b. Point SS illustrates the axis of an arrow into the plane of the page for FIG. 3B, the arrow indicating the slow scan direction corresponding to the photoreceptor travel direction.

Photoreceptor 98 is uniformly charged by corotrons 102 at a charging station preparatory to exposure by imaging beams 94a and 94b. The latent electrostatic images are developed by developer 104 and transferred at transfer station 106 to a print media 108 delivered by Paper Supply section 107. Media 108 as will appear may comprise any of a variety of sheet sizes, types, and colors.

For transfer, the print media 108 is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122, for stitching or stapling the prints together to form books, and a thermal binder 124, for adhesively binding the prints into books. Other finishing options, such as slitting, perforating, saddle stitching, folding, trimming, or the like, either singly or in combination may also be accommodated in alternate finishing modules.

Referring to FIGS. 2 and 5, controller section 17 is, for explanation purposes, divided into an image input controller 50, User Interface (UI) 52, system controller 54, main memory 56, image manipulation section 58, and image output controller 60. The units 50, 54, 56, 58, 60, comprise a system 55, which may also generally be referred to as the "Electronic Subsystem" (ESS).

The scanned image data input from processor 25 of scanner section 16 to controller section 17 is digitally compressed by image compressor/processor 51 of image input controller 50 on printed wiring board (PWB) 70-3. As the image data passes through compressor/processor 51, it is segmented into slices N scan-lines wide, each slice having a slice pointer. The compressed image data together with slice pointers and any related image descriptors providing image specific information (such as height and width of the document in pixels, the compression method used, pointers to the compressed image data, and pointers to the image slice pointers, etc.) are placed in an image file. The image files, which represent different print jobs, are temporarily stored in system memory 61, which comprises a Random Access Memory (RAM), pending transfer to main memory 56 where the data is held pending use.

Figure 7:
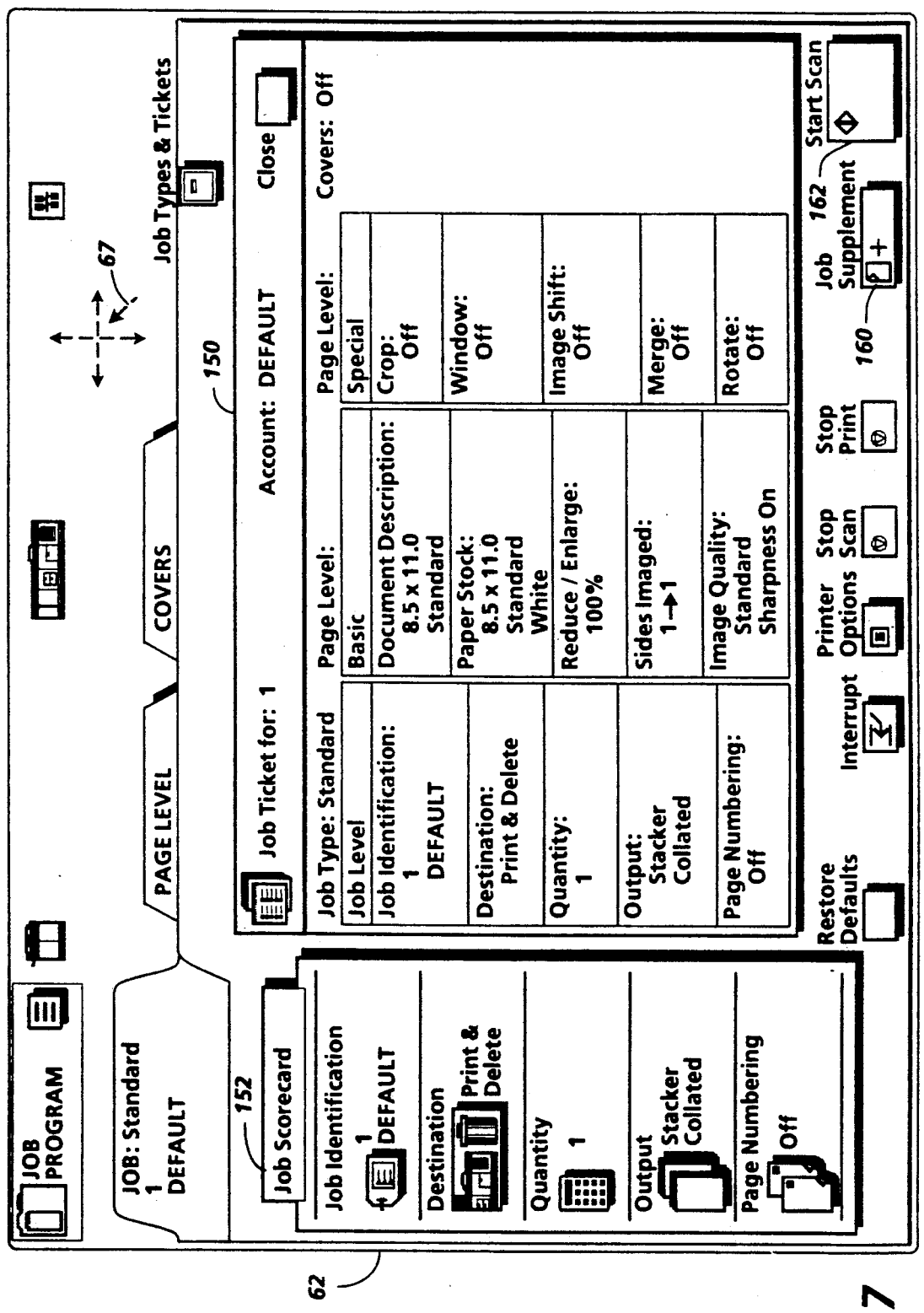
FIG. 7 is a view of an exemplary job programming ticket and job score card displayed on the user interface (UI) touchscreen of the printing system shown in FIG. 1.

As best seen in FIGS. 1 and 7, UI 52 includes a combined operator controller/CRT display consisting of an interactive touchscreen 62, keyboard 64, and mouse 66. UI 52 interfaces the operator with printing system 12, enabling the operator to program print jobs and other operational and processing instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Controller Operating System software, machine operating data, and the scanned image data currently being processed.

When the compressed image data in main memory 56 requires further processing, or is required for display on touchscreen 62 of UI 52, or is required by printer section 18, the data is accessed in main memory 56. Where further processing other than that provided by processor 25 is required, the data is transferred to image manipulation section 58 on PWB 70-6 where the additional processing steps such as collation, make ready (document editing), decomposition, rotation, etc. are carried out. Following processing, the data may be returned to main memory 56, or sent to UI 52 for display on touchscreen 62, or else sent to image output controller 60 for presentation to printer 18 for production of prints.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 18. Image data sent to printer section 18 for printing is normally purged from memory 56 to make room for new image data.

Figure 5B:
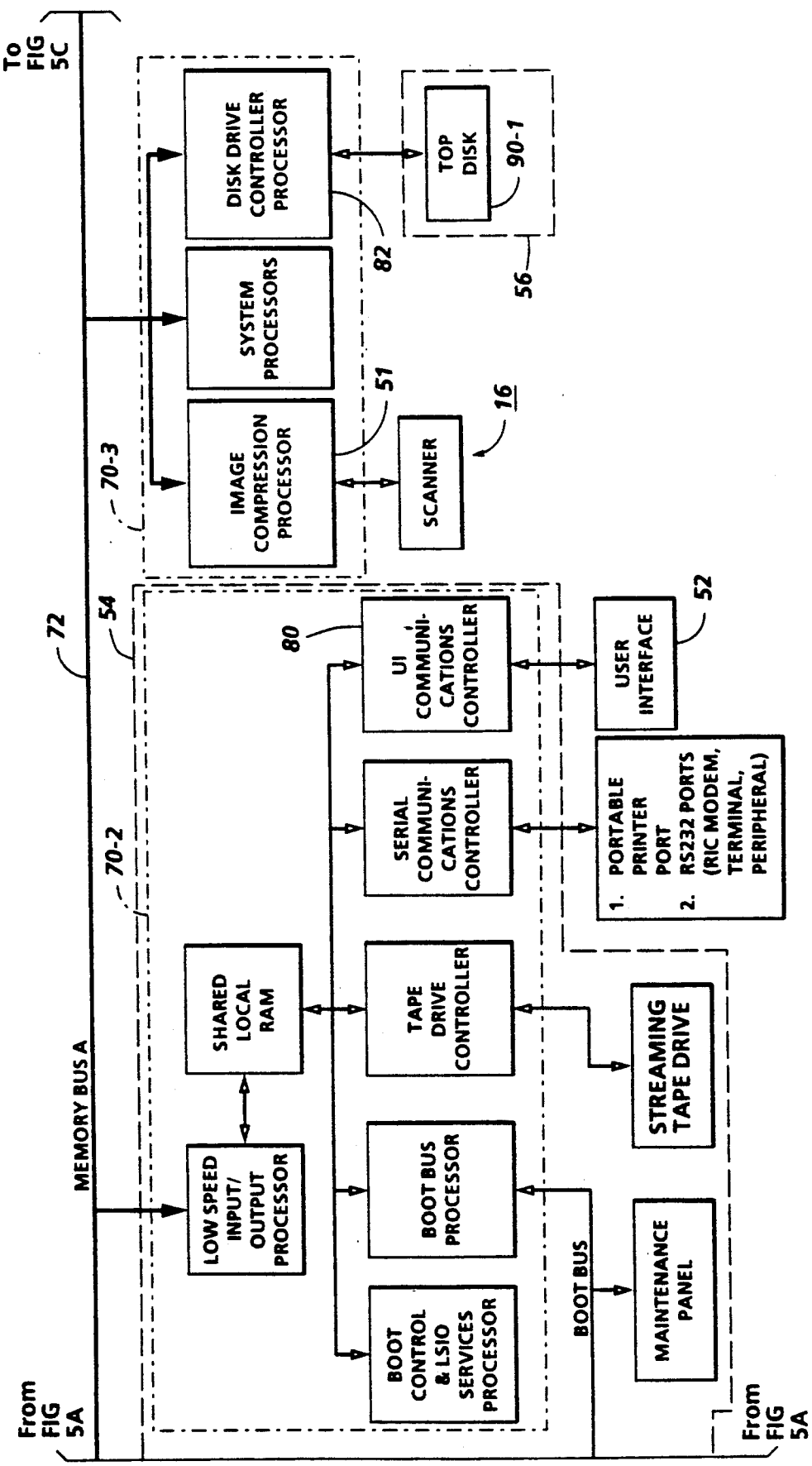
Figure 5C:
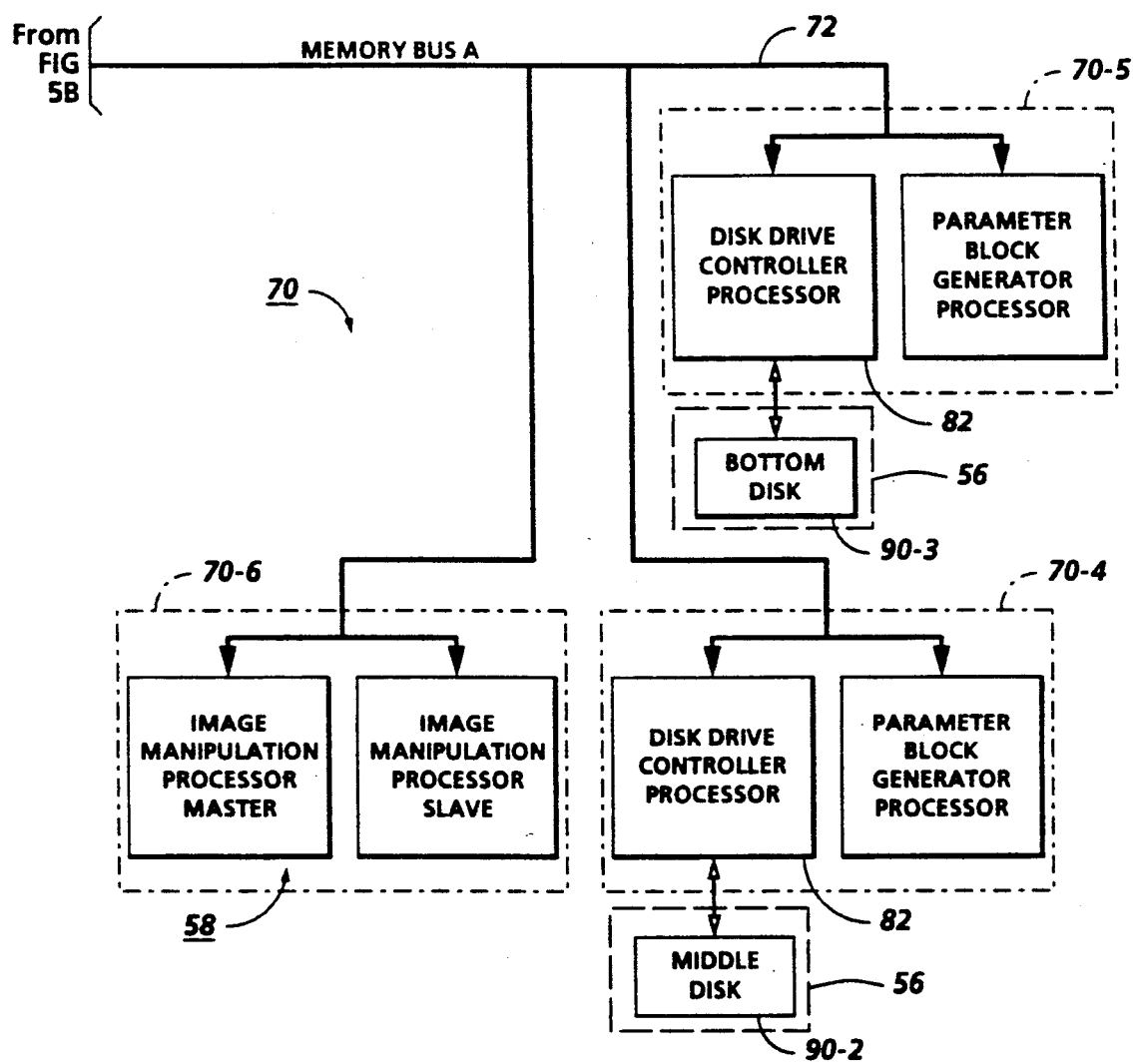

Referring particularly to FIGS. 5A-5C, control section 17 includes a plurality of Printed Wiring Boards (PWBs) 70, PWBs 70 being coupled with one another and with System Memory 61 by a pair of memory buses 72, 74. Memory controller 76 couples and arbitrates System Memory 61 with and between buses 72, 74. PWBs 70 include system processor PWB 70-1 having plural system processors 78; low speed I/O processor PWB 70-2, providing internal system control housekeeping functions, such as system boot control, auxiliary communications, I/O, etc., and having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56, and also encompassing image compressor/processor 51 for compressing the image data on PWB 70-3; image manipulation PWB 70-6 with image manipulation processors of image manipulation section 58; image generation processor PWBs 70-7, 70-8 with image generation processors 86 for processing the image data for printing by printer section 18; dispatch processor PWB 70-9 having dispatch processors 88, 89 for controlling transmission of data to and from printer section 18; and boot control-arbitration-scheduler PWB 70-10.

Figure 6:
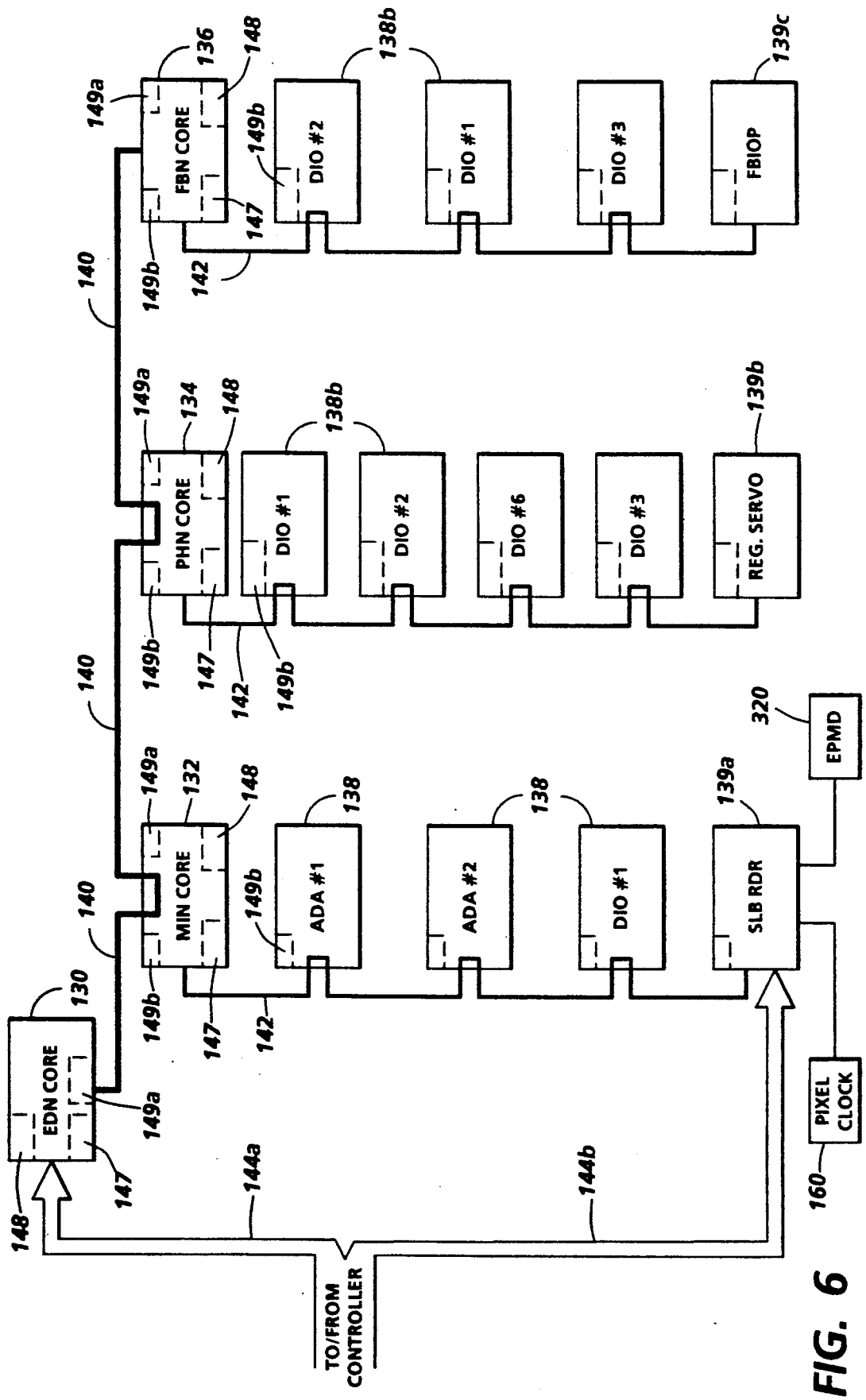
FIG. 6 is a block diagram of the printer operating system, identifying the major subsystem controllers and printed wiring boards with shared line communication connections for the printing system shown in FIG. 1.

Referring particularly to FIGS. 2 and 6, within the printer engine 18, there is an extensive printer system controller 128, to automatically and precisely control all the printer functions and operations in accordance with job program parameters received from system control 54 within controller 17, as well as internally derived signals from sensors and processes within the printer 18. Printer system control signals are derived and distributed via a plurality of printed wiring boards (PWBs) in a multi-processor architecture characterized by multiple microprocessor controller cores, serially interconnected, and also serially linked to more numerous input/output processing circuit PWB's. These include EDN (Electronic Data Node) core PWB 130, Marking Imaging core PWB 132, Paper Handling core PWB 134, and Finisher Binder core PWB 136 together with various Input/Output (I/O) PWBs 138, 139. A system serial data bus 140 couples the core PWBs 130, 132, 134, 136 with each other and serial bus 144a links EDN 130 with controller section 17, while local serial data buses 142 serve to couple the I/O PWBs 138, 139 with each other and with their associated core PWB.

The I/O PWBs may be classified into a generic, standardized category 138, generally adapted to handle the normal and common signal I/O functions, or otherwise a category 139 of unique, custom I/O controller PWBs which are designed to handle specialized, complex I/O functions requiring dedicated high-performance processing of critical signals. The categories may be further characterized as: Analog-Digital/Digital-Analog (ADA) type 138a, containing A/D and D/A conversion circuitry in order to handle and process multiple analog input signals and provide plural analog output voltages as needed; Digital Input/Output (DIO) type 138b, which directly capture numerous digital (binary) input signals and drive a variety of digital output devices; special coprocessor 139a, Scan Line Buffer/ROS Diagnostic Remote (SLB/RDR), designed to process and manage the very high speed video image data retrieved from system controller (ESS) 55, and to control and synchronize the image data and the ROS subsystem 87 to the printer activity; special coprocessor 139b, Registration Servo Controller, adapted to drive precision servo-systems in order to provide critical motion and positioning drive systems within the paper handling subsystem 107; special coprocessor 139c, Finisher/-Binder I/O Processor (FBIOP), which contains servo-system controllers and custom and standard I/O signal processing within the finisher/binder subsystem 120.

It should also be noted that the operation of SLB/RDR 139a, is supported and augmented by two additional specialized PWBs in the control and processing of image data and the ROS 87. These are: a PIXEL CLOCK PWB 160, which contains very high speed signal generation and processing circuits, including a phase-locked loop (PLL) circuit, and other functions to generate a video data "PIXEL" clock for retrieving and presenting image data to the ROS 87 in precise synchronism with the aerial scanning activity of the laser beams 94a and 94b impinging upon photoreceptor surface 98; and an Expanded Polygon Motor Driver (EPMD) PWB 320, which comprises the precision velocity servo controller and drivers for the ROS scanpolygon motor as well as many ancillary control I/O circuits and functions related to operating the high-performance dual-beam ROS 87.

On machine power up, the Operating System software is loaded from memory 56 by controller 54 to EDN core PWB 130 via bus 144a and from there to the remaining core PWBs 132, 134, 136 via bus 140, each core PWB 130, 132, 134, 136 having a boot ROM 147 for controlling: downloading of Operating system software to the PWB; fault detection; diagnostic self testing; etc. Boot ROMs 147 also enable transmission of Operating System software and control data to and from I/O PWBs 138, 139 via local buses 142. Additional ROM, RAM, and non-volatile memories (NVM) 148 are resident at various locations within system 128 to accommodate the plurality of operational tasks, algorithms, and activities which must occur concurrently in real time within printer system 18. Additionally, specialized intelligent serial communications controllers 149 which encompass integral ROM and RAM (memory), and universal asynchronous receive-transmit (UART) circuitry, together with communications operating software, handle the serial message handling and distribution over the serial communications busses. Controllers 149a are adapted for the shared-line bus 140, while controllers 149b process local bus 142 data.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

The discussion shall now concentrate on the electronic data signal modification and improvement features of the present invention.

Figure 8:
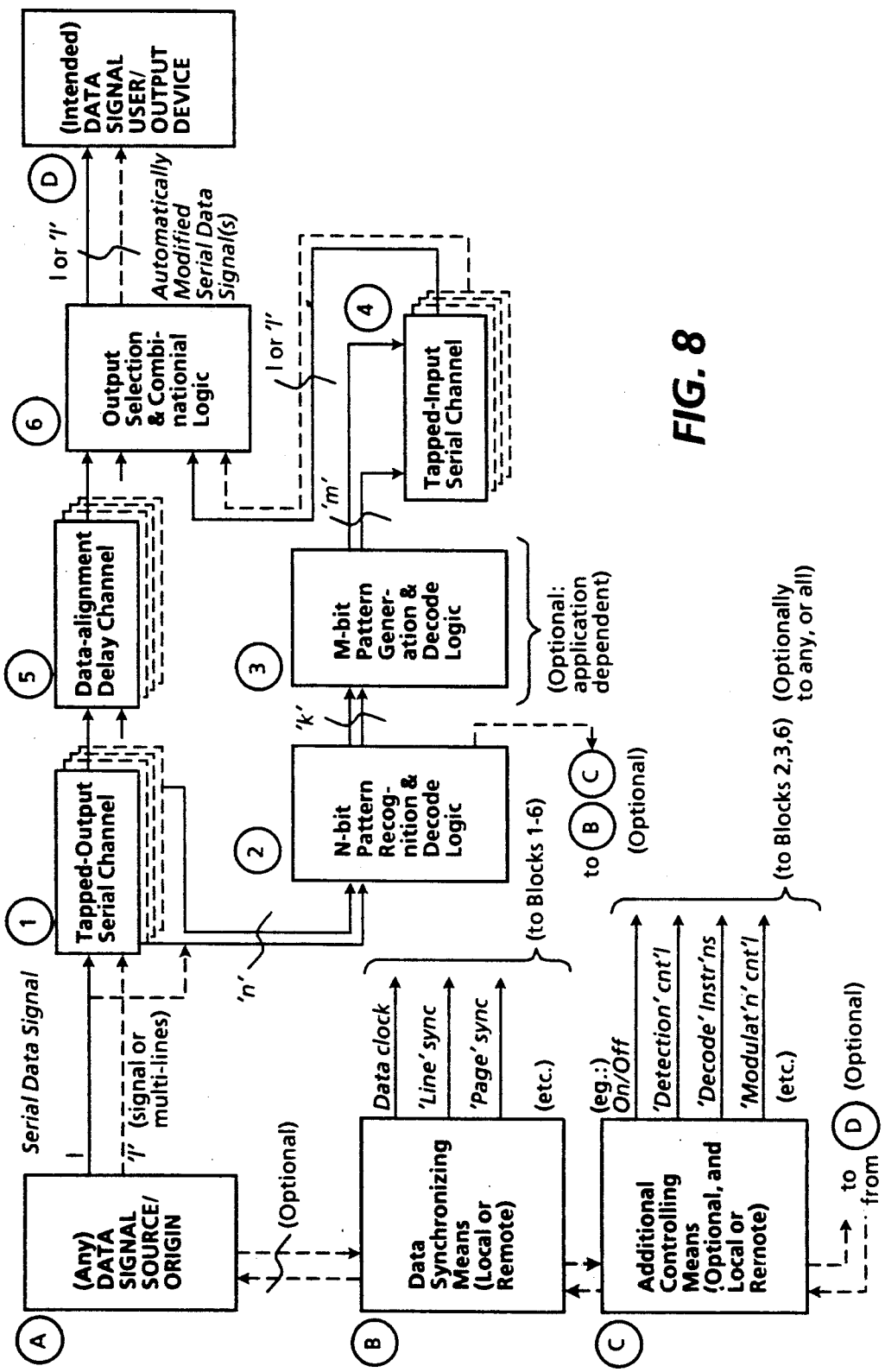
FIG. 8 is a block diagram which illustrates the "IDEAL" processing function according to the present invention.

With reference to FIG. 8 (which is a schematic block diagram of the major functional component modules), A represents any input device, source, or origin producing one or more intelligible serial data bit streams, such as those produced by system controller 55, (see FIG. 2 of the drawings). System controller 55 can also be described as an "image processor" electronics module, commonly known as a Print Service Processor (PSP), or else an "Electronic Sub System" (ESS). More specifically, the signals may be additionally stored, buffered, and processed and manipulated within the Scan Line Buffer/ROS Diagnostic Remote (SLB/RDR) PWBA 139a en route to synchronously modulate the laser light beams 94a, 94b within the ROS 87.

Modules B and C are functional components which render supporting, housekeeping and timing/controlling electronics to initiate and operate the IDEAL function (which hereinafter is the general reference to the data modification and improvement function of the present invention) and to orchestrate this IDEAL function with system requirements. These functions typically are locally derived in the SLB/RDR electronics 139a and may, if desired for programmability, interact or communicate with either input module A or with output module D, but generally does not need to do so to accomplish intended IDEAL function. Module D represents any user, or output device for the serial data bit stream. Module D accepts and utilizes either the original signal from source A, or, preferably and more beneficially, the modified signal output from the IDEAL processor, (i.e. modules 1-6 described below).

In the exemplary embodiment, module D represents the ROS 87.

The IDEAL processor which comprises modules 1–6 shown in FIG. 8 has been incorporated as part of the SLB/RDR PWBA 139a shown in FIG. 6 of the drawings. The primary function of the Scan Line Buffer SLB is to capture image data received from ESS 55 in a sequential-parallel fashion at moderate data-clocking rates, over video bus 144b and reformat this image data into very high-speed serial data bit streams which are sent synchronously to the ROS 87 in order to derive a precisely ordered and undistorted image upon media 108. The IDEAL processor can operate without disturbing the functionality and activity of the input/output functions of the electronic reprographic system and yet can independently and automatically produce vastly enhanced and more desirable results to the total process.

With reference to FIG. 8, module 1 connected to data signal source/origin module A, represents a "tapped output" serial channel, such as a serial input/parallel output shift register or the like, having n stages and outputs which continually provides the simultaneous presentation of a desired number, n, of sequential bits to pattern recognition logic module 2. Module 2 encompasses a bit-pattern (or input state) recognition logic means, wherein as many as $2^n$ possible input patterns are detected (either singly or in collective groups or ranges) and selectively produce as many as $2^k$ output states, conditions or unique new patterns, as the application requires.

Accordingly, $2^k$ may be a relatively small number, or else relatively large, but generally cannot exceed $2^n$ unless selectively instructed by additional controlling means, e.g., module C. For that class of applications where $2^k$ is relatively large (e.g., approaching $2^n$), this function may be best satisfied by a look-up table logic function, such as a $2^k \times n$ storage matrix or memory element. Alternatively, where $2^k$ is relatively small, an algorithmic translation means, derived from accounting, accumulating, and/or comparing elements or the like may be preferable.

Module 3 comprises an ancillary bit-pattern generation (or output state translation) logic means, or process, which selectively acts upon desired signal pattern conditions (i.e., the output states from module 2) to produce, or enable the generation of, a new set (up to $2^m$) of m-bit patterns for deterministically synchronous presentation to a receiving element, module 4.

Certain applications may be adequately served by logical manipulations within module 2 at the exclusion of module 3; however, the inclusion of module 3 affords an additional processing dimension, or degree of freedom, which allows incorporation of time-variant (or spatially-variant), and/or conditionally selectable processing values or parameters, such as may be necessary to implement adaptive, or predictive-real time signal processing functions. To recognize the expanded potential provided by module 3, note the case where $k=n$, module 3 may produce up to $2^m$ unique patterns for each unique n-bit input pattern, and thus create a multiplied universe of $2^n \times 2^m$ possible output states from reading and interpreting a realm of only $2^n$.

Module 4 depicts a tapped-input serial channel, such as a parallel-input/serial-output shift register or the like, having m stages which continually capture the m-bit data patterns derived from module 3 and appropriately present these m-bit data patterns in serial succession to an output processing function, module 6.

Module 5 connected to module 1 defines a delaying element, preferably of fixed length or duration such as may be provided by a D-stage serial-in serial-out shift register or the like, adapted to time-align the successively staged n-bit input data patterns to the correspondingly produced m-bit patterns emanating from module 4. The delay D will typically be implemented with either "m" delaying stages or "m+d" stages, where "d" represents a fixed offset delay such as may be suitable to the application or else required by processing time consumed through modules 2, 3 and 4.

Module 6 connected to modules 5 and 4 embodies generally combinatorial and selecting logic which may selectably perform any logical or arithmetic operation upon outputs from modules 4 and 5. These outputs include merging, masking, substituting, blocking, adding, subtracting, multiplying, etc., to produce the properly intended modified output serial data stream. The combinatorial result of module 6 may be changed according to need via instructions from module C.

The method afforded by modules 1–6 is suitable for implementing a very broad range of real-time signal processing functions and activities, such as video image enhancement; color/tone/hue/intensity control or compensation/correction; velocity/frequency/-waveform contouring or modification; image area selective masking or modification; digital code conversion/translation; data encryption/decryption; code-to-message translation; word/language conversion or translation; and signal line data tap and/or scrambler; etc.

Having outlined the "IDEAL processor" of the present invention, a more detailed discussion can now be appreciated.

Figure 9A:
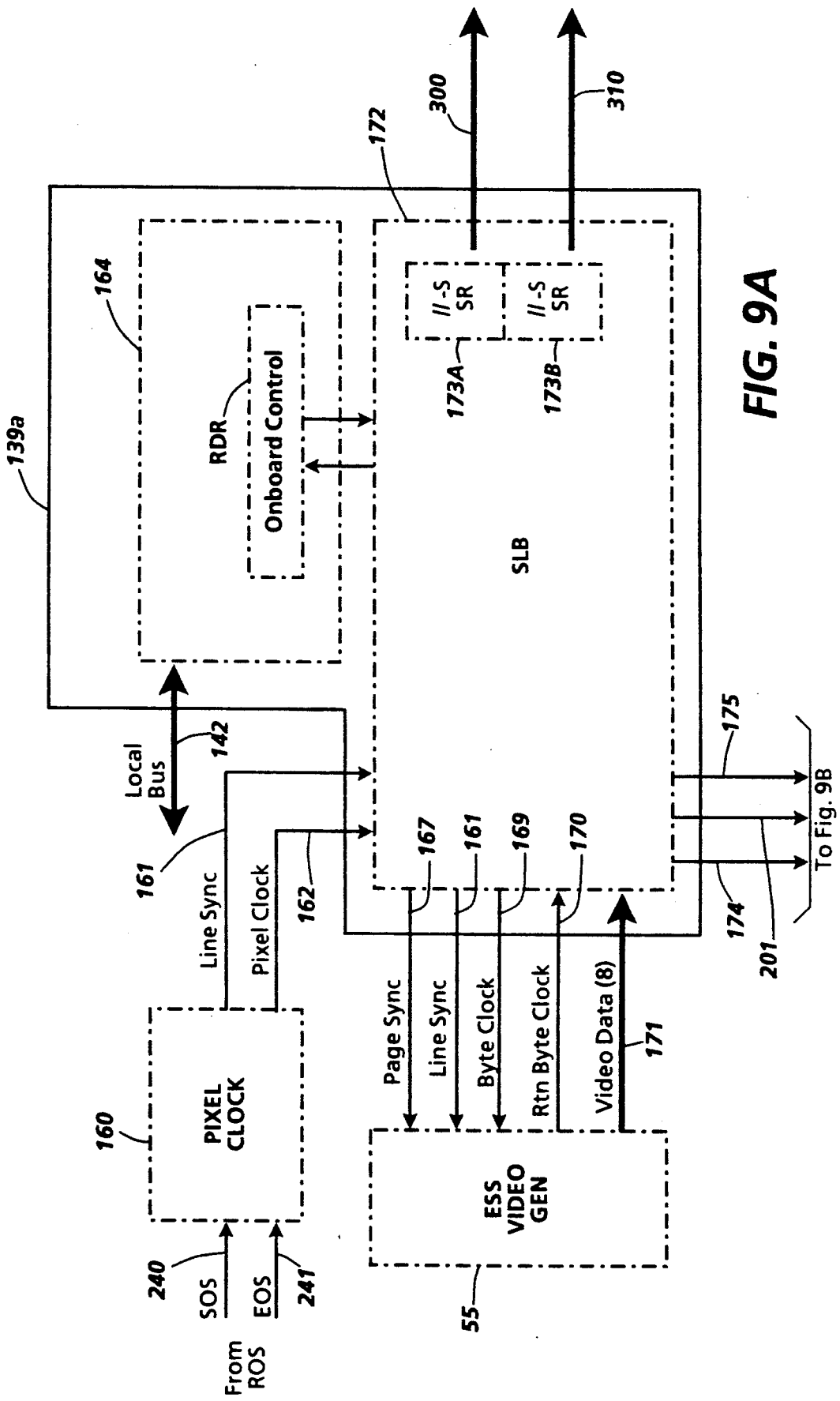
FIG. 9A is a schematic circuit diagram illustrating the scan line buffer electronics of the present invention and FIG. 9B is a schematic diagram illustrating essential aspects of the "IDEAL" circuitry of the present invention.
Figure 9C:
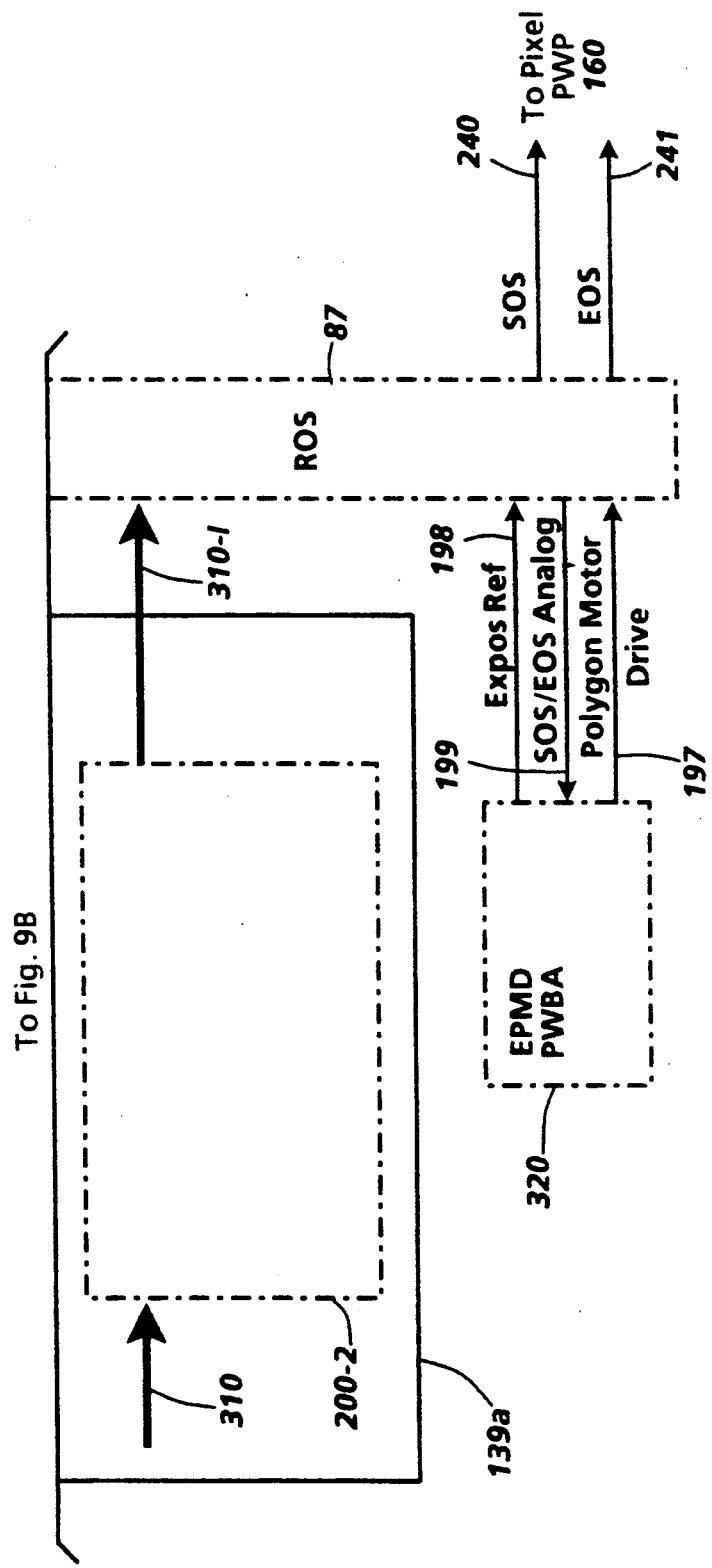

With reference to FIG. 9A, and focusing on functions contained on SLB/RDR 139a, pixel clock generator 160 supplies scan-line buffer SLB 172 with a line synchronization signal 161 and a pixel clock signal 162. RDR 164 interfaces with SLB 172 and connects to Marking Imaging Core 132, EDN Core 130, ESS 55, and UI 52 through busses 142, 140 and 144a, respectively. System control 54 and output control 60 supply SLB 172 with an eight-bit wide stream of video-data 171 and a return Byte clock signal 170 via video data bus 144b, and upon printer command and synchronizing signals from EDN 130 and from SLB 172. SLB 172 supplies output control 60 and system control 54 with a page synchronization signal 167, line synchronization signal 161 and Byte clock signal 169, via the video bus 14b, to facilitate orderly transmission of video data.

In FIG. 9B, a particular embodiment of IDEAL circuit 200-1 has a 32-bit serial channel register 176 (corresponding to modules 1 and 5 of FIG. 8) which receives a single-bit serial data stream 300 from SLB 172 and particularly from a shift register circuit 173A therein. 4-bit counter 186a also receives the serial data 300 at its decrement (count down) input. Register 176 has a center-tap stage (i.e. stage 16) output 178 connected to the increment (count up) input of 4-bit counter 186a and also connected to the decrement (count down) input of counter 186b, and further to an INVERTER 180 at an input to NOR gate 179. Counters 186a and 186b also have a threshold count assigned to a "preset count" input port and set by threshold determination circuit 195. Counters 186a, 186b and threshold circuit 195 comprise pattern recognition/- decode module 2 of FIG. 8. The serial carry/borrow outputs 184a,b of counter 186a,b respectively combine in OR gate 185, producing "D>N" signal output 187 which connect to AND gate 188. AND gate 188 output line 190 connects to NOR gate 179, which in turn connects to a synchronizing data LATCH Flip Flop 210 (AND gate 188 and NOR gate 179 comprise module 6 of FIG. 8). Pixel clock signal 162 is received by the clocking inputs of register 176 and LATCH 210, and by the clocking input of counter 186 after first passing through delay 182. The threshold determination circuit 195 which connects to counter 186 is an n-bit storage register or memory component which defines the desired threshold value(s) as a binary digital value, and this value may be selected, changed, or dynamically varied by controlling means or command from the SLB/RDR 139a (i.e., Control Module C). Norm/Extra signal command line 174 sends selectable control-point variable command signals to threshold determination circuit 195 and to pattern generator 193, which produce and provide various different detection thresholds and/or lightening pattern tables as desired. The Enable IDEAL signal 175 is also presented from SLB/RDR 139a as an input to AND gate 188 to serve as an "on-off" control to either provide or to bypass the IDEAL processing function.

Counters 186a and b receive a system initialization and Page Sync/Line Sync signal on input line 194. Pattern generator circuit 193 (corresponding to modules 3 and 4) also receives input pixel clock signal 162, byte clock signal 169, page sync signal 167, line sync signal 161 and system initialization signal 192. The output 189 from the pattern generator 193 is directed to the AND gate 188 as a third input, such that its output 190 is passed on to NOR gate 179, and injected into the video data stream, whenever IDEAL is enabled (signal 175 high) and the instantaneous detected density D exceeds the defined threshold N, i.e., whenever D>N signal 187 is also high. As mentioned earlier, output line 178 of Register 176, which is an intermediate (center) tap stage, connects to inverter 180 which is connected to NOR gate 179: this output line 178 carries the raw video image data unmodified but delayed appropriately to align with modified pattern output signal data 190. Flip Flop 210 receives the output from NOR gate 179 and outputs an IDEAL data signal 300-I to ROS 87.

The purpose of the automatic signal density detection function comprised of the just described circuitry in FIG. 9b is to perform a "running average" density determination of the video data signal, i.e., Beam 1 signal 300, as it passes through serial channel 176 at extremely high speed. At every sample time, i.e., each pixel clock 162 cycle, the detection circuits (consisting of counters 186a and b and associated circuitry) evaluate two groups of 16 successive (adjacent) data bits, which are currently contained within the channel 176 to determine how many in each group are black. If the number of black bits in a (either) group exceeds a defined (programmable) threshold count (e.g., typically around 12 at 16), the output data pattern is modified (lightened) by applying (overlaying) the output from the dynamically variable pattern generator circuit 193 (whenever it is enabled), which is appropriately synchronized to the page dimensions. For example, the pattern generator is initialized at the lead edge of each page, by page sync signal 167, and synchronously aligned with the page by line sync 161, byte clock 169, and pixel clock 162 signals, which collectively define the placement of a different 8-bit pattern group (or alternatively an [8×n]-bit repetitive group) upon successive groups of 8, (or[8×n]) data bits in either or both page dimensions, i.e., fast-scan and/or slow-scan directions. The pattern generator circuit is additionally adapted to accommodate the requirement to restrict selective pattern application only within specified regions within the page, such as a narrow region along the leading-edge page margin, if so programmed. (This circuit will be more fully described in the text which follows.)

The two density accumulator/comparator circuits, i.e., counters 186a and 186b, are essentially identical circuits which evaluate the image data patterns (for instantaneous density) surrounding the data point of interest at output line 178, in as much as circuit 186a reads the yet to be written data group after the central point of interest, while 186b simultaneously reads the just-written group before the current data bit, whereupon determination to apply overlay pattern is made if either preceding or succeeding data groups exceed the defined density threshold. The spatially distributed redundant evaluation is incorporated to apply the overlay pattern centrally over the region of darkest data and to ensure that the lightening pattern is applied fully over the entire dark region which exceeds the density threshold criterion. It is notable that the spatial distribution and also the width (i.e. number of data bits or pixels) of the data evaluation is definable according to application need, by specifying appropriate parallel output taps along channel 176 for data entry point and data exit point. Hence single or multiple data words of any desired length and phase relationship may be evaluated simultaneously by appropriately sizing the serial channel 176.

Figure 10A:
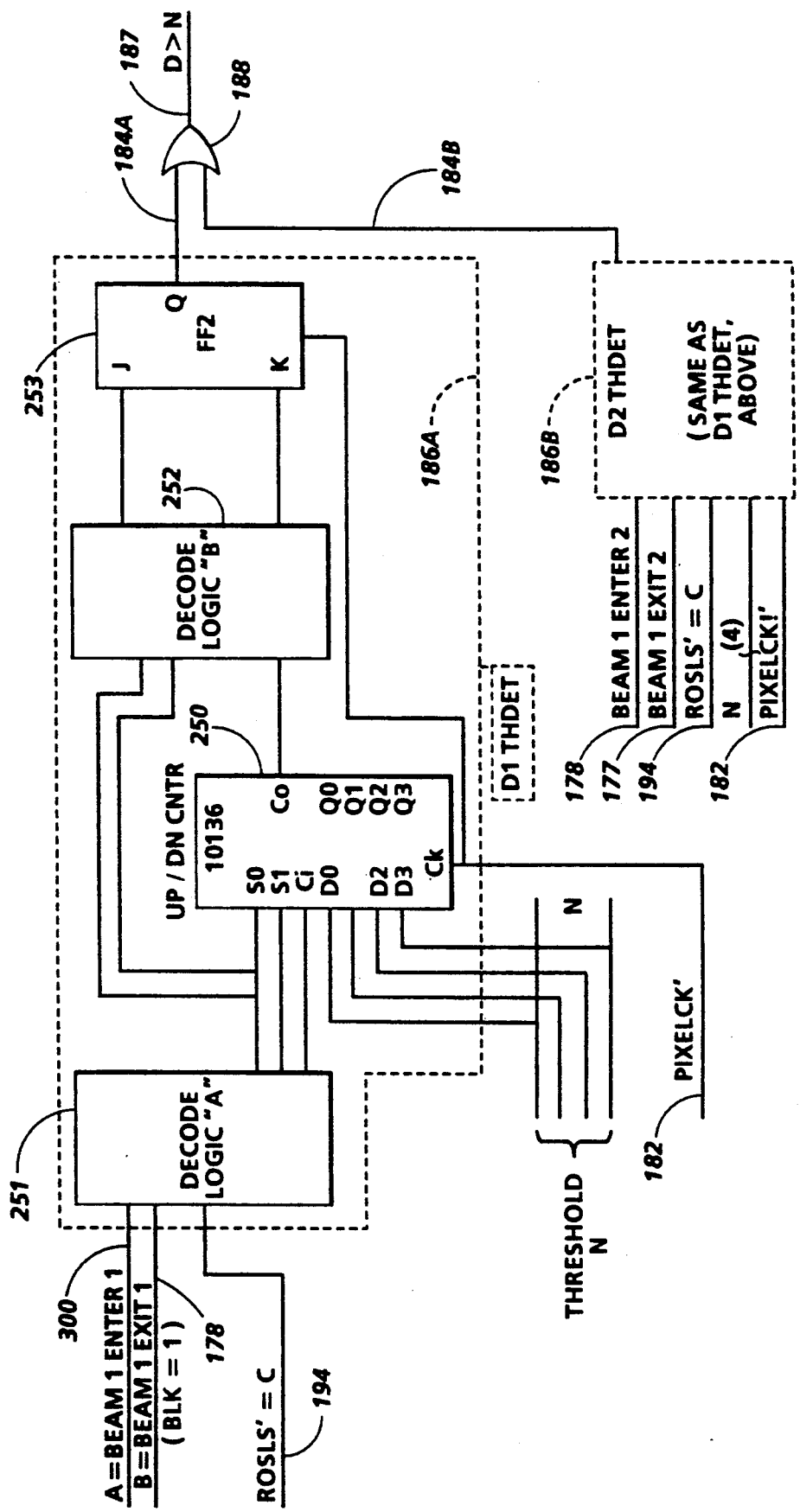
FIGS. 10A, 11A and 12A are schematic diagrams illustrating additional features of the IDEAL circuitry, and particularly the pattern recognition and pattern generation logic, in greater detail.

The density accumulator/comparator circuits, i.e., counters 186a, 186b, may be particularly implemented in various specifically different ways. For example, FIG. 10A represents an exemplary operational circuit for 186a (or 186b) implemented with a standard very high speed emitter coupled logic (ECL) 4-bit UP-DOWN counter component 250, along with straight forward input state decode logic 251, and output state decode logic 252, and a J-K type Flip-Flop (FF) 253. With reference to the Truth table of FIG. 10B defining the signal translation functions of logic 251, and also to the Truth table of FIG. 10C, defining output transformation result from logic 252 and FF 253, and also with knowledge of the operational specifications of 250 (representing an industry standard 10×136 type ECL counter), it is clear to any one skilled in the art that this circuit presets a threshold value N before each scan line (when Line Sync 194 is low), and during the active scan line (when 194 is high) the counter 250 actively counts down from N for each new Black bit entering a defined stage of the serial channel 176 (e.g. line 300) but counts up toward N for each Black bit exiting a later defined stage of the serial channel 176 (e.g. line 178): hence an instantaneous count value of N−D, where D represents the total number of Black bits currently in the channel from point of entry to point of exit. Whenever the value of D exceeds N, (D>N), the count value goes negative, and a "borrow" signal is generated by counter 250 at Co, causing the "Negative Sign Latch" 253 to be set (i.e. Q=1) at output 184a and remain set for all counts (up or down) below zero, and to be cleared (i.e. Q=0) by a "carry" signal from counter 250 at Co only when D diminishes to the value N, remaining cleared for all previously described.

A duplicate circuit 186b monitors downstream data in the serial channel 176, and its output 184b combines in the OR gate 185 with output 184a to produce D>N signal 187 to enable selective application of the lightening patterns as previously described.

Figure 11A:
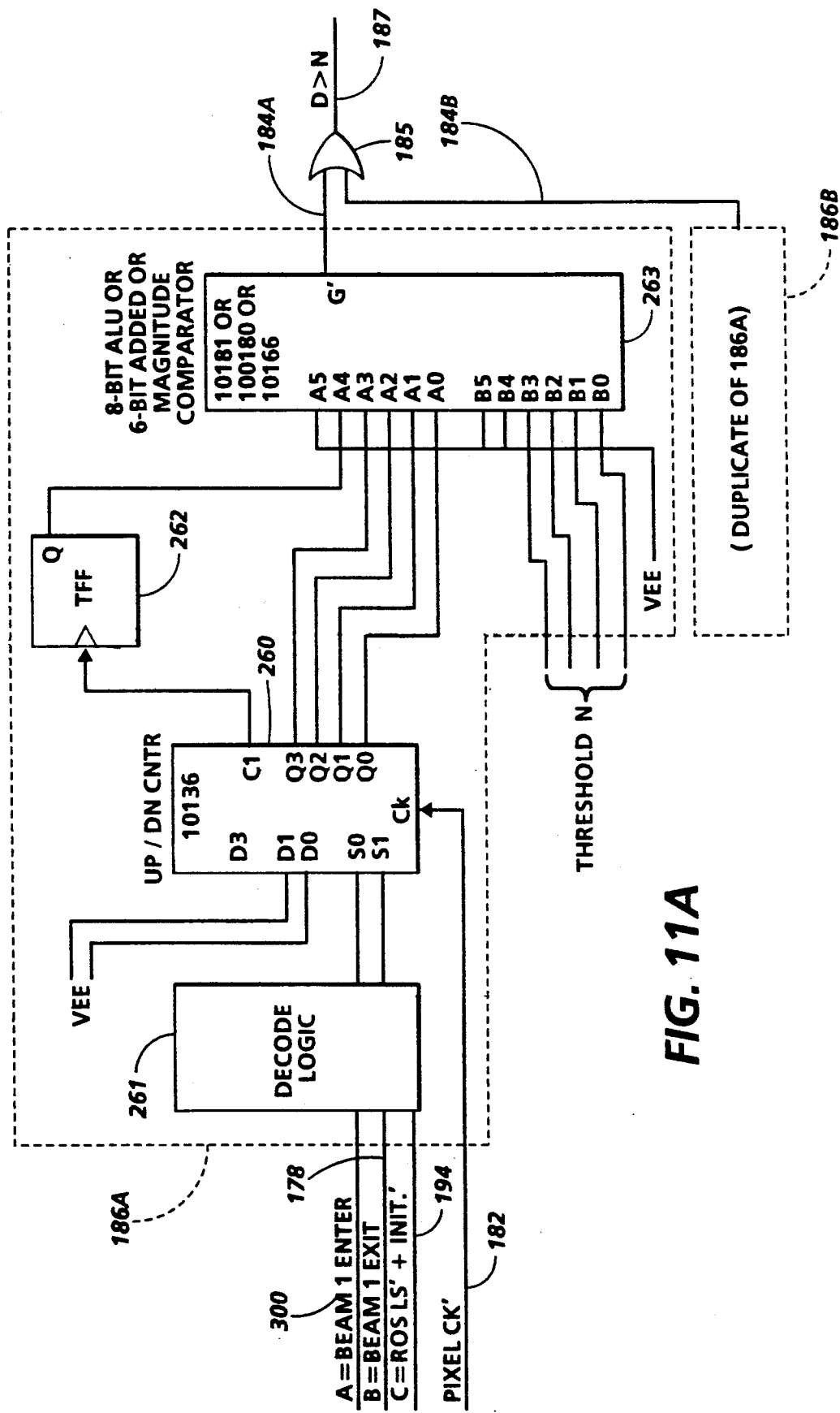

FIG. 11A there is shown an alternate particular implementation of 186a, or 186b, which performs the same functional result, FIG. 11A employs the Decode Truth Table of FIG. 11B. This method utilizes a similar 5-bit UP-DOWN counter 260 (or else a 4-bit counter with an "Over Flow Latch" Flip Flop 262), input-state decode logic 261, or a 5-bit Arithmetic Logic Unit (ALU), or an ADDER (either set to Subtract), or else a MAGNITUDE COMPARATOR 263. The SUBTRACTER/COMPARATOR circuit 263 receives the count value D output from counter 260, at a primary input port ("A"), and the threshold value N at a secondary input port ("B"), and performs a Subtract, or else a magnitude compare operation upon "B" with respect to "A", with possible results outputted at one or more outputs: D<N, D=N, or D>N. For the specified application, the output D>N, line 184a, may control the enablement of the lightening pattern, in conjunction with 184b from duplicate circuit 186b, via OR gate 185, producing D>N on line 187.

This methodology is clearly extensible, by developing multiple thresholds, or else by evaluating plural, or all, output states D from the density counter: for example the circuit could apply different amounts, levels, or degrees of "modulation" pattern (e.g. "lightening" or "darkening") to each particular density level (or density range) of the image data signal and therefore, dynamically modify, adjust, or "correct" the "gray-scale", or "intensity" content, or curve, of the received image data. Furthermore, numerous other particular embodiments or applications may be developed within the scope and realm of the present invention.

Figure 12A:
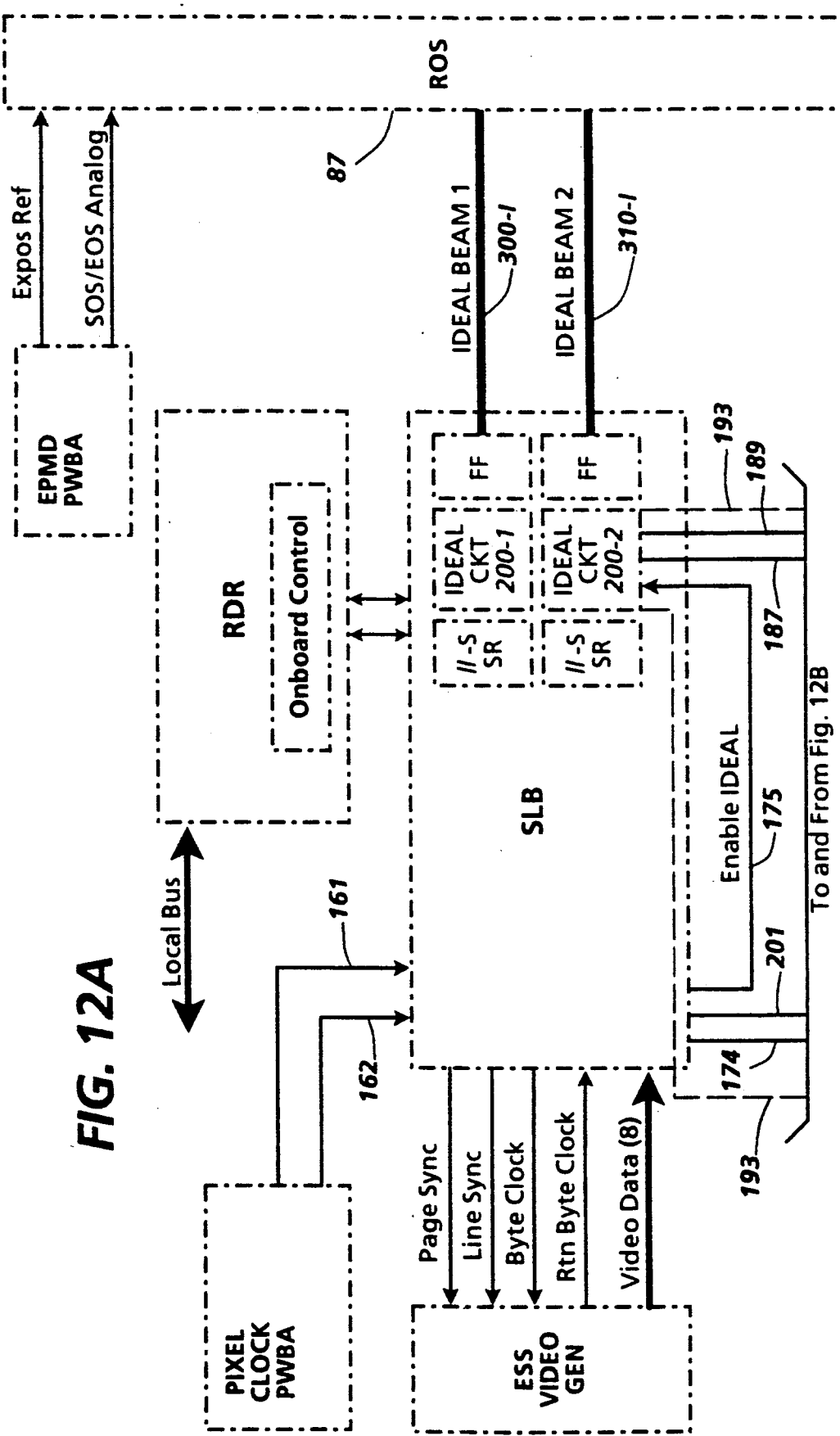
Figure 12B:
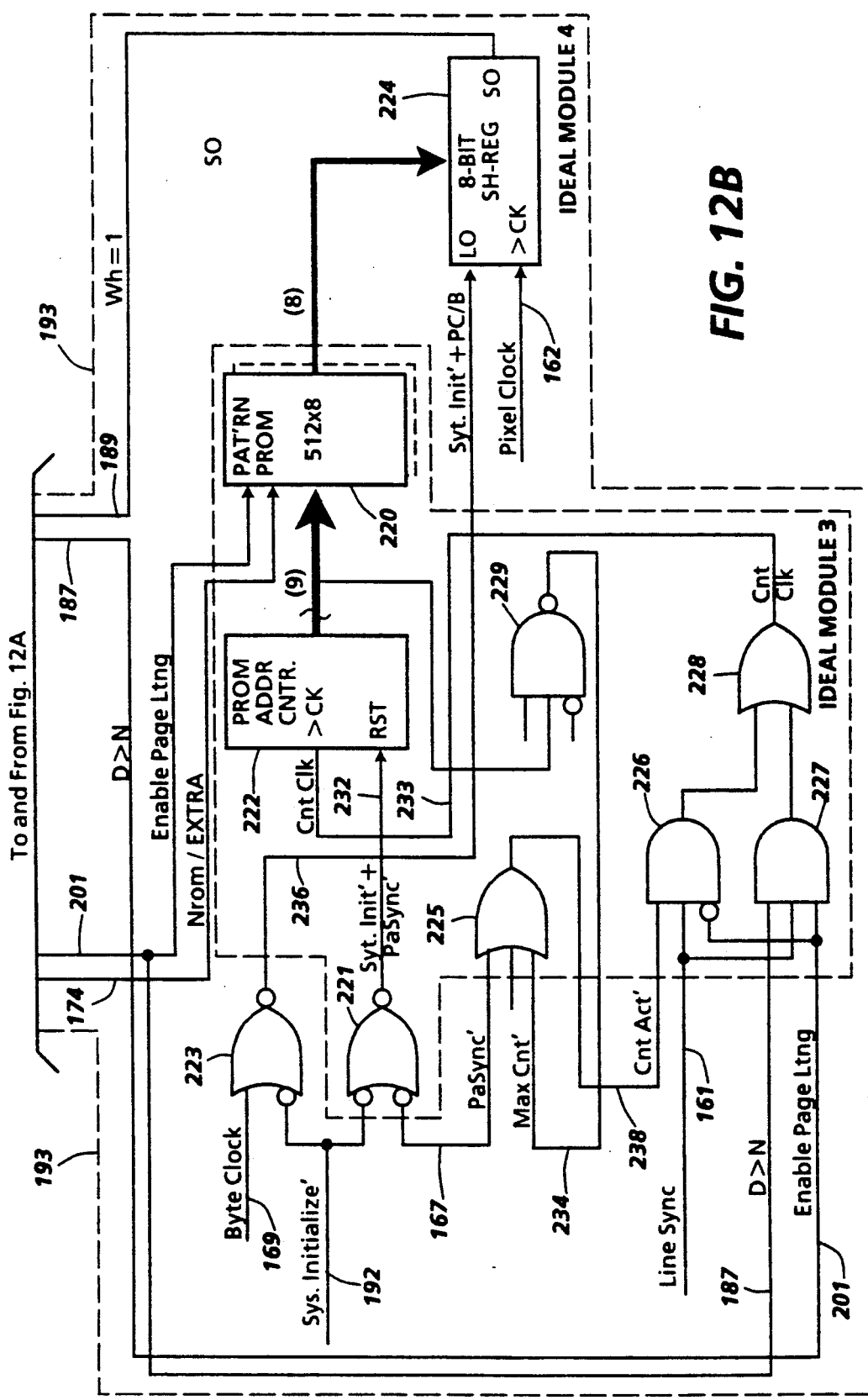

With reference to FIG. 12, an exemplary embodiment of the Selective and Spatially Variable Pattern Generator circuitry 193 is shown in greater detail within the IDEAL Processing block 200. This is a particular implementation of modules (3) and (4) of the general representation of IDEAL processing in FIG. 8, adapted as a programmable and spatially variable lightening pattern generator for modifying the video digital image data in the xerographic printer. In other applications, the look-up table and pattern generator can provide generally any required code sequence for modifying or redefining the input data, as is desired.

The pattern generator circuit 193 comprises: a lightening pattern look-up table storage element (which may consist of RAM, ROM, NVM, etc.), such as a 512×8 PROM (programmable Read-Only Memory) 220 (or similar, inasmuch as actual size and capacity may be respecified to suit particular applications); an Address Counter 222, (or other controlling means to search through the look-up table) connected thereto; and various other application specific controlling means represented by logic functions or gates 221, 223, 225-229, inclusive; and a pattern data outputting latch/register 224.

The Address Counter 222 receives an initializing command signal 232 via OR gate 221, comprised of a system initialize command 192 or page synchronization signal 167 to establish the starting address location whenever required, such as the beginning of each new page in order to commence "lead-edge" variable lightening. Address counter 222 then receives a sequence of count clocking signals 233 from OR gate 228 and increments output state count to move through the listing of stored pattern codes in the look-up table 220. Note that the particular pattern codes are completely assignable to any desired pattern or value, according to need.

The count clocking signal 233 is a conditionally gated clocking signal derived from various input conditions established through the multiple combinatorial logic functions of gates 225-227 and 229, inclusive. For example, either AND gate 226, or else AND gate 227 provides the count clocking signal, according to whether system command signal "Enable Page Lightening" 201 is low (disabled), or high (enabled), where the selective margin at each page in the first case, or otherwise is active over the full page in the second case. For the first case (i.e. lead-edge selective lightening), the count clocking activity is bounded initially in OR gate 225 by the Page Sync signal 167 at the leading edge of the page, and bounded finally by a Maximum Count signal 234 produced by count decoding NAND gate 229, which derives the same signal upon detection of a desired particular maximum count signal code pattern from the output of Address Counter 222: thus the selective and variable lightening process is activated only within the desired bounded region defined by the Count Active signal 235. In the second case (i.e. full page selective lightening), the intended selective and variable lightening process is conditionally enabled only upon exceeding programmably defined density threshold criteria, as communicated via the "D>N" signal 187; furthermore, a different set of spatially variable lightening patterns are utilized for this case by selecting a different address range within the Pattern Look-up table 220, via input signal 201.

As already indicated, the spatially variable selection of lightening patterns is accomplished with the Address counter 222 as dynamically incremented with the count clocking signal 233. Thus the rate at which the lightening pattern is changed (i.e. a new pattern code is selected in the Look-up table 220), is determined by the rate of the clocking signal 233. Hence the lightening pattern may be spatially modulated (for the purpose of "blending" or "shading" for example) along the data stream in the primary, "fast scan" dimension by utilizing an appropriately divided fractional derivative of the Pixel Clock signal 162 (such as, for example, the Byte Clock 169, which runs at one-eighth of the pixel clock frequency); and also, modulation in the orthogonally alternate "slow scan" dimension is similarly accomplished by utilizing the line sync signal 161. For the exemplary Lead-edge Lightening function, variable pattern modulation is implemented in the slow scan dimension only, so the Line Sync signal 161 dynamically drives the spatially variable pattern generator. The dynamically selected and changing sequence of lightening pattern codes emanating in byte-wide fashion from Look-up table 220, representing a sequence of eight adjacent image data pixel bits are presented to the parallel inputs of a shift register 224 (defined by module 4 of FIG. 8) for synchronous serialization and reinsertion into the serial data stream with the serialized modulation output signal 189. The register 224 is sequentially reloaded with successively current pattern code bytes from the look-up table 220 by load clock 236 from gate 223, derived from either system initialize 192 or Byte Clock 169; each code byte is thereupon serialized within each reload interval by the pixel clock 162.

While the just described particular logic in the exemplary embodiment is efficient in providing the intended requirements for the defined application, it is understood that numerous variant circuit implementations will serve different applications within the scope and context of the present invention. For example, within the Pattern Generation logic 193 (IDEAL Module 3) the Address-pointing logic to Table 220 (depicted by the collection of units 221, 222, 225-229) may generally be implemented as a State-machine, or else an applicably coded or programmed computer, microcontroller, or the like, to provide sequential, conditional, and/or random access to the Table 220, according to application requirements. Also Pattern Table 220 may be of any desired size and dimension, and may be fixed, or programmable, or dynamically variable (e.g., implemented with ROM, PROM, NVM, RAM, etc.), depending upon the application. Further, the Pattern recognition and decode logic (IDEAL Module 2), which was particularly provided by the collection of units 186a and b, 182, 195 for the density monitor/threshold application, may otherwise be implemented with any required application-specific functional logic, or else more generally in the form of a State-machine, or else an applicably coded or programmed computer, microcontroller, etc., any of which may access a look-up table, code-sequence, etc., within or among one or more storage matrices (which may be variously either fixed, programmable, or dynamically variable), according to application requirements. Also, the Data Path Selection/Merging function (IDEAL Module 6), specifically provided by the collection of units 129, 188, may generally incorporate any required logical or arithmetic operation to accomplish data enhancement, replacement, adjustment, merging, scaling, etc., and may be implemental either by application specific logic or else within registers and logic encompassed within a computing system operated by appropriately coded instruction sequence. Furthermore, the "Serial channel" registers (IDEAL Modules 1, 4, and 5), may generally be implemented as multiple channels, whereupon they become two dimensional temporary storage registers, and thus may alternately be implemented by "First-In, First-Out" (FIFO) Registers, Barrel-shifters, RAM, or "Cache" RAM, etc., and additionally their length and width dimensions may each be different and generally may be of any size, according to requirement or desired architectural construct.

Ideal circuit 200-2 (FIG. 9B) is identical to and synchronous with ideal circuit 200-1, with ideal circuit 200-2 receiving a single bit data stream 310 from SLB 172, particularly circuit 173B, and outputting an ideal data signal 310-I to ROS 87. Note that IDEAL processing may be applied to serial data paths, and also to sequential-parallel data paths of any data-bit width, 1, or else may be applied to only some of the multiple data lines. In the latter case, a stub delay channel module 5 may be substituted to keep all data channels time-aligned.

It should be noted that numerous other control functions and signals variously contained within and emanating among the Pixel PWB 160, EPMD PWB 320, SLB/RDR 139a, and ROS 87 cooperatively interact to produce and define the total functionality of the image writing subsystem. For example, ROS 87 detects precise scan timing of the serial scanning beams 94a and 94b at Start of Scan (SOS) and end of Scan (EOS), utilizing appropriately located internal scan detector sensors and circuitry (SOS 91a; EOS 91b) whereupon the precisely timed SOS and EOS signals, 240 and 241 respectively, are received within the PIXEL PWB 160 by a very accurate Phase-Lock Loop (PLL) circuit which is a part of the Pixel Clock signal generator, for continually corrected alignment of the image data within successively adjacent scan lines comprising the produced image pattern. Furthermore, laser beam effective intensity is continually monitored, facilitated by an analog output from SOS and EOS sensors, SOS/EOS Analog signal 199, received by compensation circuitry within the EPMD DWBA 320, and dynamically adjusted and corrected, according to Exposure Reference output 198, which regulates intensity of ROS beams 94 by adjusting a Light-Leveler Shutter control element 96 within ROS 87. Similarly, exposure intensity is reported to System Controller 55, via SLB/RDR 139a, etc., and may be modified and adjusted by commands therefrom. Also a precision velocity control servo system residing on the EPMD 320 delivers drive signals 197 necessary to run the Polygon Mirror Drive Motor within the ROS 87. One skilled in the art recognizes that this is a brief summary of the control circuits which enable efficient operation of the ROS imaging subsystem. More detail is not required by one skilled in the art to explain and understand the present invention.

In operation (FIGS. 9A and 9B), SLB 172 receives eight-bit video data stream 171 and dynamically converts same into two single-bit serial data signals 300 and 310, representing two adjacent scanlines of video image data. Signal 300 is output by shift register 173A and signal 310 is output by shift register 173B, shift register 173A and 173B being located in SLB 172. Signal 300 will then proceed to be input to channel register 176 and associated IDEAL processing circuitry just described. If the IDEAL circuitry is not enabled, signal 300 will proceed through channel register 176 to line 178 and to NOR gate 179 where an unmodified signal will proceed through Flip Flop 210 and to ROS 87.

If the IDEAL circuitry is enabled by the user making an appropriate selection at the UI 52, the selection is relayed along bus 142 to RDR 164 to SLB 172 and on to the IDEAL enabling line 175 which connects to AND gate 188. When the IDEAL processing function is enabled, a logic 1 is input to AND gate 188 on line 175. At the UI 52 the operator can further decide if "normal" modification or "extra" modification of the data signals 300 and 310 is desired, or further if modification be limited to "Leading-edge" page margin, or enabled for the "full page". These operating parameters are defined by lines 174 and 201, respectively. If the IDEAL processing function is enabled, the normal, leading edge mode will be initiated unless the operator specifically selects an alternate mode. In the xerographic applications of this invention, a normal modification would mean to lighten (i.e. add a variable pseudo-random pattern of "white" pixels in a field of generally black pixels) the print only within black or very dark regions (i.e., where image density exceeds a threshold) appearing on the leading edge of a page by a predetermined, but spatially varying amount. By selecting the "extra" mode, the dark print appearing on the leading edge of a page would be made even lighter than is the print on a page processed under the normal mode of operation. Similarly, for "full page" processing, the lightening process is selectively applied only to very dark or black areas of the print which exceed a specified density threshold: the selectively lightened regions will receive a slight degree of lightening with "normal" mode, or else a greater degree of fading in the "extra" mode.

When the IDEAL processing function is selected, signal 300 is input to channel register 176 and to counter 186 just the same as when the ideal processing function is not used. If a logic 1 is input to the 32-bit channel register 176, then after 16 pixel clock cycles, a corresponding logic 1 is output on line 178 (which connects to counter 186b and to NOR gate 179), and after 32 pixel clock cycles a logic 1 is output on line 177 to counters 186a and 186b. If the normal mode of operation is in effect, the threshold circuit 195 will set a "normal" threshold level (e.g., N=12) which will be loaded to the counters 186a and 186b. When counter 186a (in FIG. 10A) receives a logic 1 on line 178 (Category B) from channel register and a logic 1 on line 300 (Category A), no change will occur in the counter; if the counter receives a logic 0 from line 178 (Category B) and a logic 1 from line 300 (Category A), the counter will count down 1; if the counter receives a logic 1 from line 178 (Category B) and a logic 0 from line 300 (Category A), the counter will count up 1; if the counter receives a logic 0 from line 178 (Category B) and a logic 0 from line 300 (Category A), no change will occur in the counter. This operational function is outlined in FIG. 10B and is identically replicated in counter 186b, for which line 300 is replaced with line 178, and line 178 is replaced with line 177. When ever either of the counters counts down to 0, corresponding to the condition that the instantaneous video data image density exceeds the density threshold, a logic 1 will be sent to AND gate 188 on the D>N line 187, enabling lightening signal from pattern generator 193.

The scan-line synchronization Line Sync signal and system initialization signal input on line 194, reloads the counter with the threshold value N from register 195 every time a new line is to be printed. Pattern generator 193 receives a system initialization signal on line 192, a Page Sync signal on line 167, a Line Sync signal on line 161 and a pixel clock signal on line 162. Pattern generator 193 receives the system initialization signal on line 192, the page sync signal on line 167, the line sync signal on line 161 and the pixel clock signal on line 162. The pattern generator 193 stores patterns in a PROM and has a counter which counts each line to be printed. For each line to be printed, generator 193 contains a pattern code listing to overlay on the line on command according to previously defined input function selected and driven with the input timing signals just listed. Whenever pattern generator outputs a logic 1 onto line 189, the logic 1 represents a lightening or white signal. A logic 1 input to AND gate 188 from enabling line 175 and a logic 1 input to AND gate 188 from output line 187 of counter 186, allows the logic 1 (lightening signal 189) from pattern generator 193 to pass through AND gate 188 and onto NOR gate 179 where it is combined in the NOR gate with the output signal 178 from channel register 176. NOR gate 179 then sends the modulated output signal to flip flop 210, flip flop 210 being connected to pixel clock pulse signal 162. Flip flop 210 then synchronously outputs an IDEAL video image data stream 300-I to ROS 87.

The same sequence of events happens to data stream 310 which is sent from SLB 172 to ideal circuit 200-2 so that circuit 200-2 also outputs an ideal data stream 310-I to ROS 87.

ROS 87 is provided with a laser 90 which produces two imaging beams 94a and 94b. When beams 94 are focused upon photoreceptor 98, those locations of photoreceptor 98 which receive the beams lose an attracting charge so that toner in developer does not adhere to those locations. Thus, a logic 0 sent to ROS 87 from IDEAL circuit 200-1 will cause one beam 94a, of laser 90 to be directed on the photoreceptor and a logic 0 sent to ROS 87 from ideal circuit 200-2 will cause the other beam 94b, of laser 90 to be directed upon the photoreceptor. A logic 1 sent from either of the ideal circuits to the ROS will prevent the corresponding laser beam from being turned on at the photoreceptor.

In such a manner, the amount of toner at the lead edge of a printed page can be controlled so that paper stripping reliability of paper exiting the fuser can be improved particularly when dark image data is directed to the leading edge region of the paper. Alternatively, when operated in a full page mode, the darkest regions of a half-tone image can be "toned-down" or slightly lightened to diminish the effect of excessive contrast. Furthermore, various image processing applications may be implemented with the present invention as an outline or real time process for image editing and/or image enhancement.

The foregoing description of the invention is intended to be illustrative and not limiting. Modifications and variations can be achieved by those skilled in the art as a result of the above teachings. It is therefore to be understood that the invention may be practiced otherwise than as specifically described herein and still be within the scope of the appended claims.

What is claimed is:

1. An apparatus for selectively modifying a data pattern of image data, comprising:
    serial channel means communicating with the image data for obtaining a desired number of sequential N-bit patterns from said image data;
    recognition means communicating with the serial channel means for detecting unique bit patterns, recognized as light and dark bit patterns, from said sequential N-bit patterns;
    pattern generator means communicating with the recognition means for generating a M-bit pattern specific to each unique bit pattern;
    combinational means communicating with the serial channel means and the pattern generator means for selectively operating on the N-bit patterns and the M-bit patterns in a plurality of combinational modes to modify at least a portion of the data pattern in a response to a desired combinational mode to lighten the image data in response to recognized dark bit patterns; and
    image writing means communicating with the combinational means for printing the image data as modified by the combinational means.

2. The apparatus of claim 1, further comprising delay means in communication with and between the serial channel means and the combinational means, for time-aligning the N-bit patterns and the M-bit patterns.

3. The apparatus of claim 1, wherein the combinational means modifies a leading edge portion of the image data.

4. The apparatus of claim 1, wherein the recognition means includes counter means for evaluating a characteristic of one N-bit pattern, and comparing the characteristic to a selectively variable threshold value.

5. A method for continuously monitoring input image data in at least one data channel to automatically detect and selectively modify particular data patterns in real time, comprising the steps of:

a) tapping into a data stream of said image data to obtain N-bit patterns from said data stream;

b) detecting a plurality of unique bit patterns which are recognized as light and dark image bit patterns, with pattern recognition logic based on said N-bit patterns including the step of recognizing a dark image bit pattern;

c) obtaining at least one recognition signal from said pattern recognition logic for each unique bit pattern recognized;

d) generating a new M-bit data pattern specific for each recognition signal; and e) combining said new M-bit data patterns with the N-bit patterns to provide a modified bit pattern output for at least a portion of the input image data in the data channel including the step of lightening the dark image bit pattern.

6. The method of claim 5, wherein the step of lightening the dark image bit pattern includes the step of lightening the dark bit pattern on a selected portion of the image data.

7. The method of claim 6, wherein the selected portion of the image data is a leading edge of the image data to improve stripping of print media on which the image data is formed upon exit of the print media from a printer.

8. The method according to claim 5, wherein the combining step includes replacing at least some of said N-bit data patterns with substitute M-bit data patterns.

9. The method according to claim 5, wherein the combining step includes the step of attaching portions of the M-bit data patterns to the N-bit data patterns.

10. The method of claim 9, wherein the M-bit patterns are attached to the N-bit patterns in a prefix form.

11. The method of claim 9, wherein the M-bit patterns are attached to the N-bit patterns in a suffix form.

12. The method according to claim 8, wherein a size of the N and M-bit patterns are equal.

13. The method according to claim 5, wherein a plurality of data channels are continuously and simultaneously monitored.

14. The method of claim 5, wherein the data stream is input as a serial data stream.

15. The method of claim 14, wherein the serial data stream is output as a serial data stream.

16. The method of claim 14, wherein the serial data stream is output as a sequential-parallel data stream.

17. The method of claim 5, wherein the data stream is input as a sequential-parallel data stream.

18. The method of claim 17, wherein the sequential-parallel data stream is output as a sequential-parallel data stream.

19. The method of claim 17, wherein the sequential-parallel data stream is output as a serial data stream.

20. The method according to claim 5, wherein a first series of steps (a) to (e) occurs at a first input signal data location, and a second series of steps (a) to (e) occurs at a second input signal data location.

21. The method of claim 20, wherein the first and second series occur simultaneously at different data signal positions.

22. An apparatus for continuously monitoring input image data in at least one data channel to automatically detect and selectively modify particular data patterns in real time, the apparatus comprising:

a) a means for tapping into a data stream of said image data to obtain N-bit patterns from said data stream;

b) means for detecting a plurality of unique bit patterns which are recognized as light and dark image bit patterns with pattern recognition logic based on said N-bit patterns including means for recognizing a dark image bit pattern;

c) means for obtaining at least one recognition signal from said pattern recognition logic for each unique bit pattern recognized;

d) means for generating a new M-bit data pattern specific to each recognition signal; and e) means for combining said new M-bit data patterns with the N-bit patterns to provide a modified bit pattern output for at least a portion of the input image data in the data channel including means for lightening the dark image bit pattern.

23. The apparatus of claim 22, wherein the means for lightening the dark image bit pattern includes means for lightening the dark image bit pattern on a selected portion of the image data.

24. The apparatus of claim 23, wherein the selected portion of the image data is a leading edge of the image data to improve stripping of print media on which the image data is formed upon exit of the print media from a printer.

25. The apparatus according to claim 22, wherein the combining means includes means for replacing at least some of said N-bit data patterns with substitute M-bit data patterns.

26. The apparatus according to claim 22, wherein the combining means includes means for attaching portions of the M-bit data patterns to the N-bit data patterns.

27. The apparatus of claim 26, wherein the M-bit patterns are attached to the N-bit patterns in a prefix form.

28. The apparatus of claim 26, wherein the M-bit patterns are attached to the N-bit patterns in a suffix form.

29. The apparatus according to claim 25, wherein a size of the N and M-bit patterns are equal.

30. The apparatus according to claim 22, wherein a plurality of data channels are continuously and simultaneously monitored.

31. The apparatus of claim 22, wherein the data stream is input as a serial data stream.

32. The apparatus of claim 31, wherein the serial data stream is output as a serial data stream.

33. The apparatus of claim 31, wherein the serial data stream is output as a sequential-parallel data stream.

34. The apparatus of claim 22, wherein the data stream is input as a sequential-parallel data stream.

35. The apparatus of claim 34, wherein the sequential-parallel data stream is output as a sequential-parallel data stream.

36. The apparatus of claim 34, wherein the sequential-parallel data stream is output as a serial data stream.

37. An apparatus for selectively modifying a data pattern of a data stream comprising:

serial channel means communicating with the data stream for obtaining a desired number of sequential N-bit patterns from said data stream;

recognition means communicating with the serial channel means for detecting unique bit patterns from said sequential N-bit patterns including counter means for evaluating a characteristic of one N-bit pattern, and comparing the characteristic to a selectively variable threshold value;

pattern generator means communicating with the recognition means for generating a M-bit pattern specific to each unique bit pattern; and combinational means communicating with the serial channel means and the pattern generator means for selectively operating on the N-bit patterns and M-bit patterns in a plurality of combinational modes to modify at least a portion of the data pattern in response to a desired combinational mode.

38. A method for continuously monitoring input signal data in at least one data channel to automatically detect and selectively modify particular data patterns in real time, comprising the steps of:
a) tapping into a data stream of said input signal data to obtain N-bit patterns from said data stream;
b) detecting a plurality of unique bit patterns, with pattern recognition logic based on said N-bit patterns;
c) obtaining at least one recognition signal from said pattern recognition logic for each unique bit pattern recognized;
d) generating a new M-bit data pattern specific to each recognition signal; and
e) combining said new M-bit data patterns with the N-bit patterns to provide a modified bit pattern output for at least a portion of the input signal data in the data channel including the step of attaching portions of the M-bit data patterns to the N-bit data patterns.

39. An apparatus for continuously monitoring input signal data in at least one data channel to automatically detect and selectively modify particular data patterns in real time, the apparatus comprising:
a) a means for tapping into a data stream of said input signal data to obtain N-bit patterns from said data stream;
b) means for detecting a plurality of unique bit patterns, with pattern recognition logic based on said N-bit patterns;
c) means for obtaining at least one recognition signal from said pattern recognition logic for each unique bit pattern recognized;
d) means for generating a new M-bit data pattern specific to each recognition signal; and
e) means for combining said new M-bit data patterns with the N-bit patterns to provide a modified bit pattern output for at least a portion of the input signal data in the data channel including means for attaching portions of the M-bit patterns to the N-bit data patterns.

* * * * *